(12) United States Patent  
Ratterman et al.

(10) Patent No.: US 8,290,809 B1  
(45) Date of Patent: Oct. 16, 2012

(54) DETERMINING A COMMUNITY RATING FOR A USER USING FEEDBACK RATINGS OF RELATED USERS IN AN ELECTRONIC ENVIRONMENT

(75) Inventors: Robert J. Ratterman, Villa Hills, KY (US); Reed Maltzman, Palo Alto, CA (US); Joshua D. Knepfle, Cincinnati, OH (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 09/503,960

(22) Filed: Feb. 14, 2000

(51) Int. Cl.  
*G06Q 30/00* (2006.01)

(52) U.S. Cl. ............... 705/7.29; 705/319; 707/E17.011; 707/E17.012

(58) Field of Classification Search .................. 705/1, 7, 705/10, 37, 319, 7.29; 707/E17.011, E17.012  
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,486,853 A | 12/1984 | Parsons |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,285,496 A | 2/1994 | Frank et al. |
| 5,297,031 A | 3/1994 | Gutterman et al. |
| 5,297,032 A | 3/1994 | Trojan et al. |
| 5,305,200 A | 4/1994 | Hartheimer et al. |

(Continued)

FOREIGN PATENT DOCUMENTS

CA 2253543 3/1997

(Continued)

OTHER PUBLICATIONS

"Beyond/com Adds Customer Ratings to Web Site; First Internet Store to Post Comprehensive Online Buyers' guide to Software." Business Wire. Nov. 16, 1998.*

(Continued)

*Primary Examiner* — Justin M Pats  
(74) *Attorney, Agent, or Firm* — Schwegman Lundberg & Woessner, P.A.

(57) ABSTRACT

Community ratings are determined for users of an electronic marketplace. In a typical configuration, the community rating of an individual reflect the individual's reputation in the electronic community (e.g. feedback rating) as well as the reputations of the users the individual sponsors and the reputations of each user they sponsor, and so on. Various methodologies are provided for determining a community rating, such as aggregating feedback ratings, or weighting or thresholding these feedback ratings.

34 Claims, 8 Drawing Sheets

U.S. PATENT DOCUMENTS

| | | |
|---|---|---|
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,537,618 A | 7/1996 | Boulton et al. |
| 5,553,145 A | 9/1996 | Micali |
| 5,557,728 A | 9/1996 | Garrett et al. |
| 5,566,291 A | 10/1996 | Boulton et al. |
| 5,583,763 A | 12/1996 | Atcheson et al. |
| 5,592,375 A | 1/1997 | Salmon et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,659,366 A | 8/1997 | Kerman |
| 5,664,115 A | 9/1997 | Fraser |
| 5,669,877 A | 9/1997 | Blomquist |
| 5,678,041 A | 10/1997 | Baker et al. |
| 5,689,652 A | 11/1997 | Lupien et al. |
| 5,694,546 A | 12/1997 | Reisman |
| 5,703,624 A | 12/1997 | van Kruistum |
| 5,706,457 A | 1/1998 | Dwyer et al. |
| 5,706,493 A | 1/1998 | Sheppard, II |
| 5,706,507 A | 1/1998 | Schloss |
| 5,708,829 A | 1/1998 | Kadashevich et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,732,954 A | 3/1998 | Strickler et al. |
| 5,737,479 A | 4/1998 | Fujinami |
| 5,754,939 A | 5/1998 | Herz et al. |
| 5,760,917 A | 6/1998 | Sheridan |
| 5,761,655 A | 6/1998 | Hoffman |
| 5,771,291 A | 6/1998 | Newton et al. |
| 5,771,380 A | 6/1998 | Tanaka et al. |
| 5,774,121 A | 6/1998 | Stiegler |
| 5,778,135 A | 7/1998 | Ottesen et al. |
| 5,781,246 A | 7/1998 | Alten et al. |
| 5,787,253 A | 7/1998 | McCreery et al. |
| 5,790,426 A | 8/1998 | Robinson |
| 5,790,790 A | 8/1998 | Smith et al. |
| 5,793,027 A | 8/1998 | Baik |
| 5,794,219 A | 8/1998 | Brown |
| 5,799,285 A | 8/1998 | Klingman |
| 5,799,304 A | 8/1998 | Miller |
| 5,803,500 A | 9/1998 | Mossberg |
| 5,809,482 A | 9/1998 | Strisower |
| 5,810,771 A | 9/1998 | Blomquist |
| 5,818,914 A | 10/1998 | Fujisaki |
| 5,822,123 A | 10/1998 | Davis et al. |
| 5,826,244 A | 10/1998 | Huberman |
| 5,828,419 A | 10/1998 | Bruette et al. |
| 5,830,068 A | 11/1998 | Brenner et al. |
| 5,832,472 A | 11/1998 | Sheppard, II |
| 5,835,896 A | 11/1998 | Fisher et al. |
| 5,845,265 A | 12/1998 | Woolston |
| 5,845,266 A | 12/1998 | Lupien et al. |
| 5,848,396 A | 12/1998 | Gerace |
| 5,850,442 A | 12/1998 | Muftic |
| 5,862,230 A | 1/1999 | Darby et al. |
| 5,867,799 A | 2/1999 | Lang et al. |
| 5,870,744 A | 2/1999 | Sprague |
| 5,872,848 A | 2/1999 | Romney et al. |
| 5,872,850 A | 2/1999 | Klein et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,950,172 A | 9/1999 | Klingman |
| 5,970,469 A | 10/1999 | Scroggie et al. |
| 5,974,412 A | 10/1999 | Hazlehurst et al. |
| 5,991,739 A | 11/1999 | Cupps et al. |
| 6,029,141 A * | 2/2000 | Bezos et al. ............... 705/27 |
| 6,035,402 A | 3/2000 | Vaeth et al. |
| 6,044,363 A | 3/2000 | Mori et al. |
| 6,047,264 A | 4/2000 | Fisher et al. |
| 6,052,723 A * | 4/2000 | Ginn ............... 709/223 |
| 6,055,518 A | 4/2000 | Franklin et al. |
| 6,058,417 A | 5/2000 | Hess et al. |
| 6,061,448 A | 5/2000 | Smith et al. |
| 6,064,980 A | 5/2000 | Jacobi et al. |
| 6,066,075 A | 5/2000 | Poulton |
| 6,070,145 A | 5/2000 | Pinsley et al. |
| 6,073,117 A | 6/2000 | Oyanagi et al. |
| 6,085,176 A | 7/2000 | Woolston |
| 6,092,049 A | 7/2000 | Chislenko et al. |
| 6,101,489 A | 8/2000 | Lannert et al. |
| 6,104,815 A | 8/2000 | Alcorn et al. |
| 6,112,186 A | 8/2000 | Bergh et al. |
| 6,119,137 A | 9/2000 | Smith et al. |
| 6,134,548 A | 10/2000 | Gottsman |
| 6,141,653 A | 10/2000 | Conklin et al. |
| 6,148,299 A | 11/2000 | Yoshimoto |
| 6,161,099 A | 12/2000 | Harrington et al. |
| 6,178,408 B1 | 1/2001 | Copple et al. |
| 6,189,029 B1 | 2/2001 | Fuerst |
| 6,192,407 B1 | 2/2001 | Smith et al. |
| 6,199,049 B1 | 3/2001 | Conde et al. |
| 6,202,051 B1 | 3/2001 | Woolston |
| 6,236,975 B1 | 5/2001 | Boe et al. |
| 6,236,977 B1 | 5/2001 | Verba et al. |
| 6,237,059 B1 | 5/2001 | Dean et al. |
| 6,243,691 B1 | 6/2001 | Fisher et al. |
| 6,266,649 B1 * | 7/2001 | Linden et al. ............... 705/14 |
| 6,275,811 B1 * | 8/2001 | Ginn ............... 705/10 |
| 6,311,190 B1 | 10/2001 | Bayer et al. |
| 6,313,833 B1 | 11/2001 | Knight |
| 6,321,221 B1 | 11/2001 | Bieganski |
| 6,327,574 B1 | 12/2001 | Kramer et al. |
| 6,352,479 B1 * | 3/2002 | Sparks, II ............... 463/42 |
| 6,374,290 B1 | 4/2002 | Scharber et al. |
| 6,396,472 B1 | 5/2002 | Jacklin |
| 6,405,159 B2 * | 6/2002 | Bushey et al. ............... 703/13 |
| 6,405,175 B1 | 6/2002 | Ng |
| 6,466,917 B1 | 10/2002 | Goyal et al. |
| 6,466,918 B1 * | 10/2002 | Spiegel et al. ............... 705/7.29 |
| 6,477,509 B1 * | 11/2002 | Hammons et al. ............... 705/27 |
| 6,484,153 B1 | 11/2002 | Walker et al. |
| 6,493,703 B1 * | 12/2002 | Knight et al. ............... 1/1 |
| 6,505,201 B1 | 1/2003 | Haitsuka et al. |
| 6,523,037 B1 | 2/2003 | Monahan et al. |
| 6,539,392 B1 | 3/2003 | Rebane |
| 6,615,258 B1 | 9/2003 | Barry et al. |
| 6,697,824 B1 | 2/2004 | Bowman-Amuah |
| 6,856,963 B1 * | 2/2005 | Hurwitz ............... 705/10 |
| 6,859,783 B2 | 2/2005 | Cogger et al. |
| 6,952,678 B2 | 10/2005 | Williams et al. |
| 7,428,505 B1 | 9/2008 | Levy et al. |
| 7,587,359 B2 | 9/2009 | Levy et al. |
| 7,716,079 B2 | 5/2010 | Hanif et al. |
| 2001/0029455 A1 | 10/2001 | Chin |
| 2001/0037206 A1 | 11/2001 | Falk et al. |
| 2001/0037253 A1 | 11/2001 | Kensey |
| 2001/0047290 A1 * | 11/2001 | Petras et al. ............... 705/10 |
| 2002/0007338 A1 | 1/2002 | Do |
| 2002/0069200 A1 | 6/2002 | Cooper et al. |
| 2002/0095305 A1 | 7/2002 | Gakidis et al. |
| 2002/0118225 A1 | 8/2002 | Miksovsky |
| 2002/0138402 A1 | 9/2002 | Zacharia et al. |
| 2003/0131232 A1 | 7/2003 | Fraser et al. |
| 2003/0167209 A1 | 9/2003 | Hsieh |
| 2004/0169678 A1 | 9/2004 | Oliver |
| 2004/0210550 A1 | 10/2004 | Williams et al. |
| 2004/0225577 A1 | 11/2004 | Robinson |
| 2004/0243527 A1 | 12/2004 | Gross |
| 2004/0243604 A1 | 12/2004 | Gross |
| 2004/0267604 A1 | 12/2004 | Gross |
| 2005/0125826 A1 | 6/2005 | Hunleth et al. |

| | | | |
|---|---|---|---|
| 2007/0208454 | A1 | 9/2007 | Forrester et al. |
| 2008/0065994 | A1 | 3/2008 | Wang et al. |
| 2008/0320049 | A1 | 12/2008 | Levy et al. |
| 2010/0287064 | A1 | 11/2010 | Hanif et al. |

FOREIGN PATENT DOCUMENTS

| | | |
|---|---|---|
| FR | 2658635 A1 | 6/1991 |
| NL | 9300266 | 10/1993 |
| US | 99/18510 | 10/1998 |
| US | 00/32088 | 4/2001 |
| WO | WO 92/15174 | 2/1992 |
| WO | WO-9215174 A1 | 9/1992 |
| WO | WO 95/01711 | 6/1995 |
| WO | WO 96/34356 | 4/1996 |
| WO | WO-9634356 A1 | 10/1996 |
| WO | WO 97/37315 | 3/1997 |
| WO | WO-9737315 A1 | 10/1997 |
| WO | WO 99/63461 | 5/1999 |
| WO | WO/PCT/US01/04811 | 2/2001 |
| WO | WO-0165338 A2 | 9/2001 |
| WO | WO-0165338 A3 | 9/2001 |
| WO | WO-03010621 A2 | 2/2003 |
| WO | WO-03010621 A3 | 2/2003 |
| WO | WO-2005052835 A1 | 6/2005 |

OTHER PUBLICATIONS

Caruthers, Crystal. "Home Builder has Customer Satisfaction as its Cornerstone" . Daily Herald. Nov. 25, 1998.*

"@ Home Network Names BUYDIRECT.COM as Its Online Software Retailer". PR Newswire. Nov. 16, 1998.*

Harris, Donna. "Product Helps Dealers Reward Loyal Customers". Automotive News. Jan. 11, 1999. vol. 73. Iss. 5801. p. 38.*

Vandelo, Morton Thanning. "Narrating Corporate Reputation: Becoming Legitimate through Storytelling". International Studies of Management and Organization. Fall 1998. vol. 28. Iss. 3. pp. 120-137.*

Epinion.com www.webarchive.org/epinions.com. Nov. 27,1999 to Jan. 22, 2000. p. 1-18.*

Patience, Nick. "Epinions Launches Online Shopping Guide Built on Trust". Computergram International. Iss. 3744. Sep. 10, 1999. pp. 19-20.*

Nielsen, Jakob. "Reputation Managers are Happening".http://www.useit.com/alertbox/990905.html. Sep. 1999.*

Aho, Alfred; John Hopcroft, Jeffrey Ullman. "Data Structures and Algorithms". Addison-Wesley Publishing Company. 1983 pp. 75-89.*

Epinions.com, www.epinions.com, Nov. 28, 1999 [retrieved Nov. 12, 2003], pp. 21-28, retrieved from: Google.com and Archive.org.*

Zacharia, Giorgis, et al., "Collaborative Reputation Mechanism in Electronic Marketplaces", IEEE,1999, pp. 1-7, retrieved from Google Scholar.*

Foner, Leonard N., "Yenta: A Multi-Agent, Referral-Based Matching System", MIT Media Lab/ACM, 1997, pp. 301-307, retrieved from Google Scholar.*

Malone, TW; Yates, J; et al., "Electrnic Markets and Electronic Hierarchies", *Communications-of the ACM*, Jun. 1987, pp. 484-497, vol. 30, No. 6, USA.

Warbelow, A; Kokuryo, J, "Aucnet: TV Auction Network System". *Harvard Business School Case/Study*, Jul. 1989, pp. 1-15, HBVR#9-190-001, USA.

"Personal Optimized Decision/Transaction Program", IBM Technocal Disclosure Bulletin, Jan. 1995, pp. 83-84, vol. 38, No. 1, USA.

Neo, BS, "The implementation of an electronic market for pig trading in Singapore", *Journal of Strategic Information Systems*, Dec. 1992, pp. 278-288, vol. 1, No. 5.

Rockoff, TE; Groves, M., "Design of an Internet-based system for remote Dutch auctions", *Internet Reaearch—Electrnic Networking Applications and Policy*, Jan. 1, 1995, vol. 5, No. 4, pp. 10-16.

Massimb, MN; Phelps, BD, "Electronic Trading, Market Structure and Liquifity", *Financial Analysts Journal*, Jan.-Feb. 1994, vol. 50, No. 1, pp. 39-50, Charlottesville, Virginia.

Post, DL; Coppinger, SS, et al., "Application of Auctions as a Pricing Mechinism for the Interchange of Electric Power", *IEEE Transactions on Power Systems*, Aug. 1995, pp. 7, vol. 10, No. 3.

Hess, CM; Kemerer, CF., "Computerized Loan Organization System: An Industry Case Study of the Electronic Markets Hypothesis", *MIS Quarterly*, Sep. 1994, vol. 18, No. 3, pp. 251-274.

Reck, Martin, "Formally Specifying and Automated Trade Execution System", Journal of Systems and Software, 1993, pp. 245-252, vol. 21, Elsevier Science Publishing Co., Inc. New York, Ny.

"Anonymous Delivery of Goods in Electronic Commerce", *IBM Technocal Disclosure Bulletin*, Mar. 1996, pp. 363-366, vol. 39, No. 3.

Lee, G., "Electronic Brokerage and Electronic Auction: The Impact of IT on Market Structures", *Proceedings of the 29th HICSS*, 1996, pp. 397-406, vol. IV.

Clemins, E; Weber, B., "Evaluating the Prospects for Alternative Electronic Securities Markets", *International Conference on Information Systems*, 1991, pp. 53-61, vol. 12.

Mardesich, J., "Onsale Takes Auction gavel electronic", *Computer Reseller News*, Jul. 8, 1996, p. 2 continued on p. 32, Mountain View, California.

"Onsale joins fray as online shopping picks up speed: Internet Booms", *Computer Reseller News*, Jun. 5, 1995, p. 73, CMP Publications, Inc., USA.

Siegmann, Ken, "Nowhere to go but up", *PC Week*, Oct. 23, 1995, p. 1-3, vol. 12, No. 42, Ziff-Davis Publishing Company.

"Onsale: Onsale Brings Thrill of Auctions and Bargain Hunting Online; Unique Internet retail service debuts with week-long charity auction for the Computer Museum in Boston", May 24, 1995, pp. 3.

Schmid, BF., "The Development of Electronic Commerce", *Newsletter of the Competence Centre Electrnic Markets*, Oct. 1993, No. 9/10.

Tjostheim, I; Eide, J., "A case study of an on-line auction for the World Wide Web", *Norwegian Computing Center*, No Date Given, pp. 1-10.

Graham, I., "The Emergence of Linked Fish Markets in Europe", *Focus Theme*, No Date Given, pp. 1-3.

Reck, Martin., "Trasing-Process Characteristics of Electronic Auctions", *Focus Theme*, No Date Given, pp. 1-7.

Van Heck, E; Ribbers, PM., "Experiences with Electronic Auctions in the Dutch Flower Industry", *Focus Theme*, No Date Given, pp. 1-6.

Lee, HG., "Aucnet: Electronic Intermediary for Used-car Transactions", *Focus Theme*, No Date Given, pp. 1-5.

Klein, S., "Introduction to Electronic Auctions", *Focus Theme*, No Date Given, pp. 1-4.

Turban, E., "Auctions and Bidding on the Internet an Assessment", *Focus Theme*, No Date Given, pp. 1-5.

Zwass, Vladimir., "Electronic Commerce: Structures and Issues", *International Journal of Electrnic Commerce*, Fall 1996, pp. 3-23, vol. 1, No. 1.

International Search Report, PCT/US01/04811.

Resnick, Paul et al. Reputation Systems. Communications of the ACM, v43,n12, pp. 45-48.

Mediapraise. Mediapraise receives national award for web-based technology that enables companies to solve thorny HR problem. Business Editors, Dec. 14, 1998.

Meade, Jim. Visual 360: a performance apprasial system that's fun. HR Magazine, v44, n7, p. 118.

Chris Preist, Marten vAN Tol, "International Conference on Information and Computation Economies", *Adaptive Agents in a Persistant Shout Double Auction*, (c) 1999, pp. 2.

Ekstrom, Martin. A Rating System for AEC e-Bidding. PhD Dissertion. Nov. 27, 2000 [downloaded from the internet Nov. 13, 2001] from http://www.stanford.edu/~mekstrom/research/PhDQualifyingDocument.pdf. pp. 13-17, Fig. 2 p. 17.

Patience, Nick. Epinions Launches Oniline Shopping Guide Built on Trust. Computergram International. Sep. 10, 1999. pp. 1-2.

Nielsen, Jacob. Reputation Managers Are Happening. Alertbox., Sep. 5, 1999, Epinions.com, What is the Web of Trust. Epinions.com FAQ sheet. Downloaded Nov. 13, 2001 from the internet URL http://www.epinions.com/help/faq/?show=faqwot#001.

"Regret: A reputation model for gregarious societies" Jordi Sabater, IIIA—Artificial Intelligence Research Institute, Carles Sierra, IIIA-Artificial Intelligence Research Institute. pp. 1-9.

"Collaborative Reputation Mechanisms in Electronic Marketplaces", Proceedings of the $32^{nd}$ Hawaii International Conference on System Sciences-1999. Giorgos Zacharia, Alexandros Moukas and Pattie Maes, MIT Media Laboratory, pp. 1-19.

"Regret: A reputation model for gregarious societies" Jordi Sabater, IIIA—Artifical Intelligence Research Institute, Carles Sierra, IIIA—Artificial Intelligence Research Institute. pp. 1-9.

"Collaborative Reputation Mechanisms in Electronic Marketplaces", Proceedsings of the 32$^{nd}$ Hawaii International Conference on System Sciences- 1999. Giorgos Zacharia, Alexandros Moukas and Pattie Maes, MIT Media Laboratory, pp. 1-19.

A.J. Cann, Innovations in Education and Training International, Journal Paper, Feb. 1999, pp. 44-52, vol. 36, Routledge, United Kingdom.

Mike Heck, InfoWorld, Software Review, Aug. 2, 1999, 1 page, vol. 21, Perseus Development, United States.

Bonny L. Georgia, PC Computing, Software Review, 1 page, vol. 11, EZSurvey 98 for the Internet, United States.

Chicago Tribune, "Amazon.com (Seattle) is expanding into toys and consumer electronics in time for the Christmas holiday; will offer extensive product reviews and buying guides" Newspaper, Jul. 14, 1999, United States.

Computer Resller News, "Microsoft Corp's Office 97 brings together hundreds of new and improved features and organizes them more logically than before, according to product review" Journal, Feb. 16, 1998, United States.

Computer Reseller News, "Cybersource launches Software.net service, which provides product reviews and marketing material linked by key words" Journal, Nov. 28, 1994, p. 56, United States.

Alexandra Barrett, "What's Your Epinion?" Network World, Article, Sep. 13, 1999, United States.

Wayne Rash, "On the Prowl for the Best Internet Products", InternetWeek, Editorial, Feb. 1, 1999, p. 46, United States.

Ross M. Greenberg, Computerworld, Brief Article, Evaluation, Mar. 30, 1998, p. 53, United States.

Beth Lipton Krigel, Big chances ahead for Deja News, CNET News.com, Online Article (http://news.com.com/2100-1023-225101.html), Apr. 28, 1999, 3 pages, United States.

Janet Kornblum, Consumer Reports an online win, CNET News.com, Online Article (http://news.com.com/2100-1023-217386.html), Nov. 2, 1998, 2 pages, United States.

Troy Wolverton, Productopia launches-product review site, CNET News.com, Online Article (http://news.com.com/2100-1017-228811.html), Jul. 21, 1999, 2 pages, United States.

NAD 412 Reviews, Found on WayBackMachine (http://web.archive.org/web/19990203004345/www.audioreview/com/reviews/Tuner/nad_412_tuner.shtmil) Online Reviews, 5 pages, Feb. 3, 1995, (printed Aug. 28, 2003) United States.

Welcome to Product ReviewNet! Your Source for Product Review Information, Online Review (http://web.archive.org/web/19991114054251/www.productreview/com/splash.html), 1 page, United States.

Paul Festa, Have an Epionion?, CNET News.com, Online Article, Jul. 9, 1999, 2 pages, United States.

Aho, A. V., "Directed Graphs", *Date Structures And Algorithms*, Addison-Wesley Publishing Company, Menlo Park, California,(1983), 198-219.

BEYOND.COM, "IMS Web Spinner Personal V1.26 for Win95/98/NT", http://web.archive.org/web/20000125152017/www.beyond.com/PKSN104373/prod.htmcrewiew, (1998-2000),3 pages.

BUYCLEARANCE.COM, "The Internet Clearance Superstore: Product Information", http://web.archive.org/web/20000124120021/www.buy.com/clearance/productasp?sku=70000254, [Field error on website], 1 page.

Consumer Review!, "49,000 Product Reviews by Consumers for Consumers", http://web.archive.org/web/19981206010249/http://www.consumerreview.com, (1996-1998).

Guglielmo, Connie, "BizRate Lets Consumers Rate Sites", *Interactive Week*, 4(22), (Aug. 4, 1997).

Miller, Michael J., "The Best Products of 1999 Revealed", *ZDNet*http://www.zdnet.com/anchordesk/stories/story/0,10738,5019537,00.html,(Dec. 13, 1999),2 pages.

MTB Review, "http://www.mtbr.com", http://www.mtbr.com, The attached mtbr.pdf which includes screen shots from a Mountain Biking Resource Review web site taken from Wayback Machine Internet Archive located at http://www.archive.org/web/web.php., (Archived Jan. 25, 1997).

PRICESCAN.COM, "PriceSCAN: Your Unbiased Guide to the Lowest Prices on Books, Computers, Electronic . . .", http://web.archive.org/web/19991117123352/www.pricescan.com, (1997-99),1 page.

Product Reviewnet!, "Welcome to Product ReviewNet! The Premier Online Source for Product Review Abstracts", http://web.archive.org/web/19981201205356/www.productreviewnet.com/splash.html, (1996-1998).

http://pages.ebay.com/helo/feedback/questions/leaving-feedback.html. Wayback Machine Internet archive, (Nov. 10, 1999),3 pages.

"International Search Report PCT/US00/17136", PCT/US00/17136.

"International Search Report PCT/US01/12398", PCT/US01/12398.

"Social Network", Wikipedia the free encyclopedia—http://en.wikipedia.org/wiki/Soical_networking, (Archived Apr. 1, 2004), 1-7.

Annen, Kurt , "Social Capital, Indusive Networks, and Economic Performance", *Journal of Economic Behavior & Organization*. vol. 50. Issue 4, (2003), 1-27.

Barrett, Alexandra , "What's Your Epinion? On Epinion.com, read product reviews by regular folks, then post your own", *Network World*, (Sep. 13, 1999),2 pgs.

Business Wire, "Mediappraise Receives National Award for Web-based Technology That Enables Companies to Solve Thorny HR Problem", *Business Wire*, (Dec. 14, 1998), 1-2.

Hanneman, Robert A., "Introduction to Social Network Methods", On-line textbook, Riverside. CA: University of California Riverside, (2001), 1-150.

Jordan, Ken , "The Augmented Social Network: Building identity and trust into the next-generation Internet", firstmonday. peer-previewed journal on the internet.http://www.firstmonday.dk/issues/issue8_8/jordan/. (Archived Aug. 2, 2003), 1-66.

Mardesich, Jodi , "Site Offers Clearance for End-of-Life Products—Onsale Takes Auction Gavel Electronic", *Computer Reseller News*, (Jul. 8,1998),2 pages.

Mui, Lik , "A Computational Model of Trust and Reputation", *Proceedings of the 35th Hawaii International Conference on System Sciences*—2002, (2002),9 Pages.

Pujol, Josep M., "Extraxting Reputation in Multi Agent Systems by Means of Social Network Topology", *Proceedings of the first international joint conference on Autonomous agents and multiagent systems*, (2002),8 Pages.

Rasmusson, Lars , "Simulated Social Control for Secure Internet Commerce", *Proceedings of the 1996 Workshop on New Security Paradigms*, Lake Arrowhead, California, United States,(Apr. 1, 1998)18-25.

Sabater, Jordi , et al., "Reputation and Social Network Analysis in Multi-Agent Systems", *IIIA—Artifical Intelligence Research Institute. CSIC—Spanish Scientific Research Council* Bellaterra, Catalonia. Spain, 8 pages.

Vivian, Nathan , "Social Networks in Transnational and Virtual Communities", *Informing Science, InSITE—"Where Parallels Intersect"*, (Jun. 2003).1431-1437.

Wellman, Barry , "An Electronic Group is Virtually a Social Network", almost final version of Chapter 9 in Sara Kiester. ed.. Culture of the Internet, Hillsdale, NJ; Lawrence Erlbaum, (1997),26 Pages.

Yu, Bin , "A Social Mechanism of Reputation Management in Electronic Communities", *Proceedings of the 4th International Workshop on Cooperative Information Agents IV, The Future of Information Agents in Cyberspace*, (2000),154-165.

www.archive.org/web/19991122031437/http://pages.ebay.com/help/basics/f-feedback.html#3via_the_Wayback_Machine, (Nov. 10, 1999).

http://web.archive.org/web/19990825071501 and http://web.archive.org/web/19991122063932, Retrieved on Jan. 20, 2006 from wayback machine, www.ebay.com, (Nov. 10, 1999), 5 pgs.

"U.S. Appl. No. 09/412,893, Advisory Action mailed May 19, 2003", 3 pgs.

"U.S. Appl. No. 09/412,893, Final Office Action mailed Jan. 6, 2003", 8 pgs.

"U.S. Appl. No. 09/412,893, Non-Final Office Action mailed Sep. 9, 2002", 7 pgs.

"U.S. Appl. No. 09/412,893, Preliminary Amendment mailed May 3, 2000", 7 pgs.

"U.S. Appl. No. 09/412,893, Response filed May 6, 2003 to Final Office Action mailed Jan. 6, 2003", 4 pgs.

"U.S. Appl. No. 09/412,893, Response filed Dec. 9, 2002 to Non-Final Office Action mailed Sep. 9, 2002", 6 pgs.

"U.S. Appl. No. 09/412,893 Advisory Action mailed Jun. 19, 2006", 3 pgs.

"U.S. Appl. No. 09/412,893 Advisory Action mailed Oct. 11, 2005", 3 pgs.

"U.S. Appl. No. 09/412,893 final office action mailed Feb. 17, 2004", 16 pgs.

"U.S. Appl. No. 09/412,893 final office action mailed Mar. 27, 2006", 32 pgs.

"U.S. Appl. No. 09/412,893 Final office action mailed Jul. 26, 2005", 22 pgs.

"U.S. Appl. No. 09/412,893 final office action mailed Nov. 30, 2004", 14 pgs.

"U.S. Appl. No. 09/412,893 non final office action mailed Mar. 7, 2005", 15 pgs.

"U.S. Appl. No. 09/412,893 non final office action mailed Jul. 22, 2004", 14 pgs.

"U.S. Appl. No. 09/412,893 non final office action mailed Oct. 21, 2003", 14 pgs.

"U.S. Appl. No. 09/412,893 non final office action mailed Nov. 22, 2005", 20 pgs.

"U.S. Appl. No. 09/412,893 Response filed Jan. 22, 2004 to non final office action mailed Oct. 21, 2003", 26 pgs.

"U.S. Appl. No. 09/412,893 Response filed Feb. 21, 2006 non final office action mailed Nov. 22, 2005", 16 pgs.

"U.S. Appl. No. 09/412,893 Response filed May 30, 2006 final office action mailed Mar. 27, 2006", 6 pgs.

"U.S. Appl. No. 09/412,893 Response filed Jun. 4, 2004 to final office action mailed Feb. 17, 2004", 15 pgs.

"U.S. Appl. No. 09/412,893 Response filed Jun. 7, 2005 non-final office action mailed Mar. 7, 2005", 13 pgs.

"U.S. Appl. No. 09/412,893 Response filed Sep. 24, 2005 final office action mailed Jul. 26, 2005", 15 pgs.

"U.S. Appl. No. 09/412,893 Response filed Sep. 29, 2004 non-final office action mailed Jul. 22, 2004", 15 pgs.

"U.S. Appl. No. 09/515,575 Notice of Allowance mailed Mar. 8, 2007", 10 pgs.

"U.S. Appl. No. 09/515,575, Notice of Allowance mailed Aug. 6, 2008", 10 pgs.

"U.S. Appl. No. 09/515,575, Supplemental Amendment filed Oct. 4, 2007", 10 pgs.

"U.S. Appl. No. 09/515,575 Advisory Action mailed Mar. 22, 2004", 2 pgs.

"U.S. Appl. No. 09/515,575 Advisory Action mailed Dec. 12, 2006", 3 pgs.

"U.S. Appl. No. 09/515,575 Amendment Under 37 CFR 1.312 filed Jun. 4, 2007", 12 pgs.

"U.S. Appl. No. 09/515,575 Final Office Action mailed May 22, 2002", 19 pgs.

"U.S. Appl. No. 09/515,575 Final Office Action mailed Sep. 22, 2006", 18 pgs.

"U.S. Appl. No. 09/515,575 Final Office Action mailed Dec. 17, 2003", 18 pgs.

"U.S. Appl. No. 09/515,575 Non Final Office Action mailed Mar. 21, 2006", 17 pgs.

"U.S. Appl. No. 09/515,575 Non Final Office Action mailed Jul. 13, 2004", 6 pgs.

"U.S. Appl. No. 09/515,575 Non Final Office Action mailed Jul. 18, 2001", 16 pgs.

"U.S. Appl. No. 09/515,575 Non Final Office Action mailed Sep. 14, 2005", 18 pgs.

"U.S. Appl. No. 09/515,575 Non Final Office Action mailed Dec. 19, 2002", 19 pgs.

"U.S. Appl. No. 09/515,575 Response filed Jan. 17, 2006 to Non Final Office Action mailed Sep. 14, 2005", 11 pgs.

"U.S. Appl. No. 09/515,575 Response filed Feb. 27, 2004 to Final Office Action mailed Dec. 17, 2003", 12 pgs.

"U.S. Appl. No. 09/515,575 Response filed Apr. 21, 2003 to Non Final Office Action mailed Dec. 19, 2002", 10 pgs.

"U.S. Appl. No. 09/515,575 Response filed Jun. 21, 2006 to Non Final Office Action mailed Mar. 21, 2006", 6 pgs.

"U.S. Appl. No. 09/515,575 Response filed Sep. 16, 2002 to Final Office Action mailed May 22, 2002", 15 pgs.

"U.S. Appl. No. 09/515,575 Response filed Oct. 13, 2004 to Non Final Office Action mailed Jul. 13, 2004", 14 pgs.

"U.S. Appl. No. 09/515,575 Response filed Oct. 18, 2001 to Non Final Office Action mailed Jul. 18, 2001", 23 pgs.

"U.S. Appl. No. 09/515,575 Response filed Nov. 7, 2006 to Final Office Action mailed Sep. 22, 2006", 13 pgs.

"U.S. Appl. No. 09/515,575 Notice of Allowance mailed Apr. 23, 2008", NOAR, 5 PgS.

"U.S. Appl. No. 09/740,502 final office action mailed Jan. 27, 2006", 23 PGS.

"U.S. Appl. No. 09/740,502 final office action mailed Mar. 2, 2005", 23 PGS.

"U.S. Appl. No. 09/740,502 final office action mailed Apr. 19, 2007 Pgs", 12 PGS.

"U.S. Appl. No. 09/740,502 non-final office action mailed Oct. 19, 2006", 12 PGS.

"U.S. Appl. No. 09/740,502 non-final office action mailed Aug. 8, 2005", 23 PGS.

"U.S. Appl. No. 09/740,502 non-final office action mailed Sep. 16, 2004", 21 PGS.

"U.S. Appl. No. 09/740,502 Response filed Jan. 23, 2007 non-final office action mailed Oct. 19, 2006", 11 PGS.

"U.S. Appl. No. 09/740,502 Response filed Nov. 8, 2005 non-final office action mailed Aug. 8, 2005", 27 PGS.

"U.S. Appl. No. 09/740,502 Response filed Dec. 16, 2004 non-final office action mailed Sep. 16, 2004", 25 PGS.

"U.S. Appl. No. 09/740,502 Response filed Mar. 27, 2006 final office action mailed Jan. 27, 2006", 24 PGS.

"U.S. Appl. No. 09/740,502 Response filed May 1, 2005 final office action mailed Mar. 2, 2005", 22 PGS.

"U.S. Appl. No. 09/740,502 Response filed Jul. 5, 2007 final office action mailed Apr. 19, 2007", 5 PGS.

"U.S. Appl. No. 09/740,502, Advisory Action mailed Apr. 24, 2006", 4 pgs.

"U.S. Appl. No. 09/740,502, Advisory Action mailed Jul. 19, 2007", 4 pgs.

"U.S. Appl. No. 09/740,502, Non-Final Office Action mailed Jul. 31, 2008", 13 pgs.

"U.S. Appl. No. 09/740,502, Preliminary Amendment mailed Dec. 2, 2003", 20 pgs.

"U.S. Appl. No. 09/740,502, Response filed Mar. 24, 2008 to Non-Final Office Action mailed Jan. 4, 2008", 9 pgs.

"U.S. Appl. No. 09/740,502, Response filed Oct. 22, 2007 to Final Office Action mailed Apr. 19, 2007", 10 pgs.

"U.S. Appl. No. 09/740,502, Response filed Oct. 30, 2008 to Non-Final Office Action mailed Jul. 31, 2008", 17 pgs.

"U.S. Appl. No. 09/740,502 Final Office Action mailed Jan. 14, 2009", 17 pgs.

"U.S. Appl. No. 09/740502, Non-Final Office Action mailed Jan. 4, 2008", OARN, 3 pgs.

"U.S. Appl. No. 10/746,583, Non-Final Office Action mailed Jun. 3, 2008", 12 pgs.

"U.S. Appl. No. 10/746,583, Non-Final Office Action mailed Dec. 10, 2008", 27 pgs.

"U.S. Appl. No. 10/746,583, Response filed Sep. 3, 2008 to Non-Final Office Action mailed Jun. 3, 2008", 17 pgs.

"U.S. Appl. No. 10/749,736, Final Office Action mailed Jul. 28, 2006", 11 pgs.

"U.S. Appl. No. 10/749,736, Final Office Action mailed Sep. 1, 2005", 9 pgs.

"U.S. Appl. No. 10/749,736, Non Final Office Action mailed Feb. 3, 2006", 10 pgs.

"U.S. Appl. No. 10/749,736, Non Final Office Action mailed Feb. 16, 2005", 12 pgs.

"U.S. Appl. No. 10/749,736, Non-Final Office Action mailed Jan. 8, 2009", 09 pgs.

"U.S. Appl. No. 10/749,736, Response filed Jan. 3, 2006 to Final Office Action mailed Sep. 1, 2005", 11 pgs.

"U.S. Appl. No. 10/749,736, Response filed Jun. 13, 2005 to Non Final Office Action mailed Feb. 16, 2005", 18 pgs.

"U.S. Appl. No. 10/749,736, Response filed Jul. 3, 2006 to Non Final Office Action mailed Feb. 3, 2006", 13 pgs.

"U.S. Appl. No. 11/758,196, Notice of Allowance mailed Mar, 20, 2008", 8 Pgs.

"U.S. Appl. No. 11/758,196, Preliminary Amendment filed Oct. 4, 2007", 6 pgs.

"U.S. Appl. No. 11/758,196, Supplemental Preliminary Amendment filed Nov. 16, 2007", 7 pgs.

"Ebay—What is Mutual Feedback Withdrawal?", [Online]. Retrieved from the Internet: <URL:http://pages.ebay.com/help/feedback/questions/mutual-withdrawal.html>, (Accessed Apr. 3, 2006), 6 pgs.

"Entry for "Withdraw"", *Merriam-Webster's Collegiate Thesaurus*, Property of U.S. Government, (1988), 859.

"European Application Serial No. 04819526.7, European Search Report mailed Jun. 17, 2008", 3 pgs.

"International Application Serial No. PCT/US04/38096, International Search Report mailed Mar. 16, 2005", 5 pgs.

"International Application Serial No. PCT/US04/38096, Written Opinion mailed Mar. 16, 2005", 8 pgs.

"U.S. Appl. No. 10/746,583 Non-Final Office Action mailed Jun. 3, 2008", OARN, 6pgs.

"Ebay Community chat", ebay.com_webpage_from_web.archive.org, (Dec. 12, 2000), 1-2.

"eBay Help: Basics : FAQ : Feedback", ebay.com webpage from web.archive.org, (Oct. 12, 1999), 1-3.

"eBay Help: community Standards: eBay Help: Rules and safety", ebay.com webpage from_web.archive.org, (Aug. 1, 2000), 1-2.

"eBay Leave Feedback about an eBay User", ebay.com_webpage from web.archive.org, (Aug. 25, 1999), 1-2.

"ebay Listings : Cufflinks, Studs", ebay.com_webpage_from_web.archive.org, (Feb. 8, 2001), 1-3.

"ebay: The ebay Q&A Board", ebay.com_webpage_from_web.archive.org, (Oct. 3, 2000), 1-21.

"See the Feedback Profile of an eBay User", ebay.com_webpage_from_web.archive.org, (Dec. 5, 2000), 1.

"The Feedback Forum", ebay.com_webpage_from_web.archive.org, (Dec. 17, 2000), 1-2.

Abdul-Rahman, A., et al., "Supporting Trust in Virtual Communities", *Proceedings of the 33rd Hawaii International Conference on System Sciences*,6(6), (2000), 1-25.

Abdul-Rahman, Alfarez, et al., "Using Recommendations for Managing Trust in Distributed Systems", *IEEE Malaysia International Conference on Communication*, (1997), 1-7.

Aberer, Karl, et al., "Managing Trust in a Peer-2-Peer Information System", *Proceedings of the tenth international conference on Information and knowledge management*, Atlanta, Georgia, USA, (2001), 310-317.

Baumann, G. W, "Personal Optimized Decision/Transaction Program", *IBM Technical Disclosure Bulletin*, (Jan. 1995), 83-84.

Carter, Jonathan, et al., "Reputation Formalization Within Information Sharing Multiagent Architectures", *Computational Intelligence*, 2(5), (2002), 45-64.

Dellarocas, C., "Immunizing online reputation reporting systems against unfair ratings and discriminatory behaviour", Proceedings of the 2nd ACM conference on Electronic commerce, (2000), 150-157.

Dellarocas, C., "The Digitization of Word-of-Mouth: Promise and challenges of Online Reputation Mechanisms", *Sloan School of Management, MIT*, (Oct. 1, 2002), 1-38.

Dellarocas, Chrysanthos, "Mechanisms for coping with unfair ratings and discriminatory behavior in online reputation reporting systems", *Proceedings of the Twenty First International Conference on Information Systems*, (2000), 520-525.

Dellarocas, Chrysanthos, "The Design of Reliable Trust Management Systems for Electronic Trading Communities", *Working Paper, Sloan School of Management, Massachusetts Institute of Technology*, (2001), 1-45.

Donath, J., "Identity and Deception in the Virtual Community", In Kollock, P. and Smith, M. (Eds.) Communities in Cyberspace: Perspectives on New Forms of Social Organization. Berkeley: University of California Press, MIT Media Lab, 1997 , 1-25.

Friedman, E. J, et al., "The Social Cost of Cheap Pseudonyms", Rutgers University, *Dept.of Economics*, (Aug. 2000), 1-32.

Friedman, Eric, "Robust Social Norms in Bargains and Markets", Draft, Rutgers University, (1999), 1-23.

Friedman, Eric, et al., "The Social Cost of Cheap Pseudonyms", *Journal of Economics and Management Strategy*, 10(2), (2000), 173-199.

Malaga, R. A, "Web-Based Reputaton Management Systems: Problems and Suggested Solutions", vol. 1, 2001 , 403-417.

Malone, T., et al., "Electronic Markets and Electronic Hierarchies", *Communications of the ACM*, (Jun. 1987), vol. 14, Issue 25.

Mui, L., et al., "Ratings in Distributed Systems: A Bayesian Approach", *Proceedings of the Workshop on Information Technologies and Systems (WITS)*, 1-7.

Neo, B S, "The implementation of an electronic market for pig trading in Singapore", *Journal of Strategic Information Systems*. vol. 1 (5), (Dec. 1992), 278-288.

Ono, C., et al., "Trust-Based Facilitator for e-Partnerships", *Proceedings of the Fifth International Conference on Autonomous Agents*, (2001), 108-109.

Resnick, P., et al., "Trust among Strangers in Internet Transactions: Empirical Analyses of eBay's Reputation System", *NBER Workshop*, (Feb. 5, 2001), 1-26.

Sabater, J., et al., "Reputation and Social ntework analysis in multi-agent systems", International Conference on Autonomous Agents archive, Proceedings of the first international joint conference on Autonomous agents and multiagent systems, Bologna, Italy.: Session 2D: group and organizational dynamics, (2002), 475-482.

Schneider, Jay, et al., "Disseminating Trust Information in Wearable Communities", *2nd International Symposium on Handheld and Ubitquitous Comput-* 10 ing (HUC2K), (2000), 1-5.

Venkatraman, Mahadevan, et al., "Trust and Reputation Management in a Small-World Network", *Proceedings of the Fourth International Conference on MultiAgent Systems (ICMAS-2000)*, (2000), 1-2.

Warbelow, A, et al., "Aucnet: TV Auction Network System", Harvard Business School Case/Study, HBVR#9-190-001, USA, (Jul. 1989), 1-15.

Yu, Bin, et al., "A Social Mechanism of Reputation Management in Electronic Communities", *Proceedings of the 4th International Workshop on Cooperative Information Agents IV, The Future of Information Agents in Cyberspace*, (2000), 154-165.

Zacharia, Giorgos, et al., "Collaborative Reputation Mechanisms in Electronic Marketplaces", *Proceedings of the 32nd Hawaii International Conference on System Sciences*, (1999), 1-7.

Zachiara, et al., "Collaborative reputation mechanisms for electronic marketplaces", Decision support systems, vol. 29, (Dec. 2000), 371-388.

"U.S. Appl. No. 09/412,893, Non-Final Office Action mailed Jul. 20, 2009", 2 pgs.

"U.S. Appl. No. 09/412,893, Preliminary Amendment filed Oct. 5, 1999", 1 pg.

"U.S. Appl. No. 09/740,502, Final Office Action mailed Jan. 4, 2010", 16 pgs.

"U.S. Appl. No. 09/740,502, Response filed Sep. 10, 2009 to Non Final Office Action mailed Jun. 10, 2009", 13 pgs.

"U.S. Appl. No. 09/740,502, Response filed Mar. 4, 2010 to Final Office Action mailed Jan. 4, 2010", 13 pgs.

"U.S. Appl. No. 10/746,583 , Non-Final Office Action mailed Oct. 15, 2009", 13 pgs.

"U.S. Appl. No. 10/746,583, Response filed Jan. 15, 2010 to Non Final Office Action mailed Oct. 15, 2009", 13 pgs.

"U.S. Appl. No. 10/746,583, Response filed Jul. 17, 2009 to Restriction Requirement mailed Jun. 17, 2009", 8 pgs.

"U.S. Appl. No. 10/746,583, Restriction Requirement mailed Jun. 17, 2009", 6 pgs.

"U.S. Appl. No. 10/749,736, Notice of Allowance mailed Sep. 14, 2009", 4 pgs.

"U.S. Appl. No. 10/749,736, Notice of Allowance mailed Dec. 24, 2009", 5 pgs.

"U.S. Appl. No. 10/749,736, Response filed Aug. 31, 2009 to Final Office Action mailed May 29, 2009", 11 pgs.

"Chinese Application Serial No. 200480038176.0, Office Action mailed Dec. 4, 2009", 9 pgs.

"European Application Serial No. 04819526.7, Summons to Attend Oral Proceedings mailed: Jan. 28, 2010", 7 pgs.

Dellarocas, Chrysanthos, "The design of reliable trust management systems for electronic trading communities", - *Arbeitsbabier, MIT, Citeseer*, (2002), 45 pgs.

Langley, Paul A., "Building cognitive feedback into a microworld learning environment: Results from a pilot", *System dynamics*, - systemdynamics.orq, (1995), 1 pg.

Svensson, Lars, "Discursive evaluation in a distributed learning community", *Australian Journal of Educational Technology—Citeseer*, (2002), 11 pgs.

"U.S. Appl. No. 09/412,893, Appeal Brief filed Aug. 2, 2006", 26 pgs.

"U.S. Appl. No. 09/412,893, Non Final Office Action mailed Sep. 9, 2002", 7 pgs.

"U.S. Appl. No. 09/412,893, Preliminary Amendment filed Sep. 8, 2003", 23 pgs.

"U.S. Appl. No. 09/412,893, Response filed Dec. 9, 2002 to Non Final Office Action mailed Sep. 9, 2002", 6 pgs.

"U.S. Appl. No. 09/515,575, Examiner Interview Summary mailed Apr. 17, 2003", 2 pgs.

"U.S. Appl. No. 09/515,575, Examiner Interview Summary mailed Aug. 13, 2002", 12 pgs.

"U.S. Appl. No. 09/515,575, Examiner Interview Summary mailed Sep. 6, 2007", 3 pgs.

"U.S. Appl. No. 09/515,575, Non Final Office Action mailed Mar. 21, 2006", 17 pgs.

"U.S. Appl. No. 09/740,502, Examiner Interview Summary mailed Mar. 17, 2008", 2 pgs.

"U.S. Appl. No. 09/740,502, Non-Final Office Action mailed Jun. 10, 2009", 15 pgs.

"U.S. Appl. No. 09/740,502, Preliminary Amendment filed Apr. 28, 2003", 14 pgs.

"U.S. Appl. No. 09/740,502, Response filed Mar, 16, 2009 to Final Office Action mailed Jan. 14, 2009", 12 pgs.

"U.S. Appl. No. 10/746,583, Response filed Mar. 10, 2009 to Non-Final Office Action mailed Dec. 10, 2008", 16 pgs.

"U.S. Appl. No. 10/749,736, Appeal Brief filed Dec. 18, 2006", 23 pgs.

"U.S. Appl. No. 10/749,736, Examiner Interview Summary filed Jan. 2, 2009", 2 pgs.

"U.S. Appl. No. 10/749,736, Examiner Interview Summary mailed Dec. 2, 2008", 2 pgs.

"U.S. Appl. No. 10/749,736, Examiner Interview Summary mailed Dec. 10, 2008", 4 pgs.

"U.S. Appl. No. 10/749,736, Final Office Action mailed May 29, 2009", 9 pgs.

"U.S. Appl. No. 10/749,736, Pre-Appeal Brief Request for Review filed Sep. 27, 2006", 5 pgs.

"U.S. Appl. No. 10/749,736, Response filed Apr. 7, 2009 to Non Final Office Action mailed Jan. 8, 2009", 13 pgs.

"U.S. Appl. No. 11/758,196, Notice of Allowance mailed Apr. 23, 2009", 6 pgs.

"U.S. Appl. No. 11/758,196, Notice of Allowance mailed Aug. 1, 2008", 6 pgs.

"eBay Feedback Removal Policy", [Online]. Retrieved from the Internet: <URL:. http://pages.ebay.com/help/community/fbremove.html>, (Jun. 19, 2000), 2 pgs.

"eBay, eBay Feedback Removal Policy", [Online] Archived Feb. 14, 2005. Retrieved from the Internt: <URL: http://pages.ebay.com/help/community/fbremove.html>, (Jun. 19, 2000), 3 pgs.

"eBay: The Feedback Forum", www.archive.org:, (Oct. 12, 1999), 4 pgs.

"European Application Serial No. 01274337.3, Office Action Mailed Feb. 13, 2009", 4 pgs.

"European Application Serial No. 04519526.7, Office Action mailed Feb. 4, 2009", 6 pgs.

"Feedback Overview and Feedback Forum", [Online]. Retrieved from the Internet: <URL: www.ebay.com>, (1999), 4 pages.

"Give some feedback on an Auction Web user", [Online]. Retrieved from the Internet: <URL: http://web.archive.org/web/19981203032739/www2ebay.com/aw/user-feedback.html>, (May 18, 2005), 2 pgs.

"U.S. Appl. No. 12/202,145, Notice of Allowance mailed Dec. 3, 2010", 10 pgs.

"Chinese Application Serial No. 01822389.3, Office Action mailed Mar. 9, 2007", 9 pgs.

"Chinese Application Serial No. 01822389.3, Response filed Jul. 24, 2007 to Office Action mailed Mar. 9, 2007", 19 pgs.

"Chinese Application Serial No. 200480038176.0, Response filed Apr. 8, 2010 to Office Action mailed Dec. 4, 2009", 33 pgs.

"European Application Serial No. 01274337.3, European Search Report mailed Nov. 15, 2005", 2 pgs.

"European Application Serial No. 01274337.3, Response filed Aug. 24, 2009 to Office Action mailed Feb. 13, 2009", 37 pgs.

"European Application Serial No. 01913244.8, Office Action mailed Sep. 16, 2005", 1 pg.

"European Application Serial No. 01913244.8, Office Action mailed Nov. 18, 2005", 6 pgs.

"European Application Serial No. 01913244.8, Response filed Apr. 28, 2006 to Office Action mailed Nov. 18, 2005", 10 pgs.

"European Application Serial No. 01913244.8, Search Report mailed Sep. 14, 2005", 2 pgs.

"European Application Serial No. 01913244.8, Summons to Attend Oral Proceedings mailed on: Nov. 15, 2010", 11 pgs.

"International Application Serial No. 2005052835, International Preliminary Examination Report Mar. 17, 2006", 21 pgs.

"International Application Serial No. PCT/US01/06709, International Preliminary Examination Report mailed Mar. 25, 2002", 14 pgs.

"International Application Serial No. PCT/US01/50499, International Preliminary Examination Report mailed Dec. 3, 2004", 4 pgs.

"U.S. Appl. No. 10/746,583, Final Office Action mailed Apr. 28, 2010", 14 pgs.

"U.S. Appl. No. 10/746,583, Response filed Jul. 28, 2010 to Final Office Action mailed Apr. 28, 2010", 10 pgs.

"U.S. Appl. No. 12/202,145, Non-Final Office Action mailed May 14, 2010", 12 pgs.

"U.S. Appl. No. 12/202,145, Response filed Sep. 3, 2010 to Non Final Office Action mailed May 14, 2010", 21 pgs.

"U.S. Appl. No. 12/777,144 Non-Final Office Action mailed Oct. 5, 2010", 3 pgs.

"Celebrating Its Third Year Anniversary eBay Sets Standard for Online Person-To-Person Trading", PR Newswire, New York, (FeedbackForum) downloaded from ProQuest Direct on the Internet on May 9, 2010, (Sep 15, 1998.), p. 1.

"European Application Serial No. 04819526.7, EPO Written Decision to Refuse mailed Jun. 2, 2010", 12 pgs.

"Meg Muscles eBay Uptown, Fortune", Special Report,, downloaded from ProQuest Direct on the Internet on May 9, 2010, 7 pages, (Jul. 5, 1999), 81-88.

"U.S. Appl. No. 12/777,144, Final Office Action mailed Apr. 7, 2011", 15 pgs.

"U.S. Appl. No. 12/777,144, Response filed Mar. 7, 2011 to Non Final Office Action mailed Oct. 5, 2010", 12 pgs.

"Chinese Application Serial No. 200480038176.0, Office Action mailed Jan. 25, 2011", 5 pgs.

"Chinese Application Serial No. 200480038176.0, Non Final Office Action mailed Jan. 25, 2011", 3.

"U.S. Appl. No. 12/202,145, Applicant's Summary of Examiner Interview filed Jan. 3, 2011", 1 pg.

"U.S. Appl. No. 12/777,144, Appeal Brief filed Feb. 16, 2012", 16 pgs.

"U.S. Appl. No. 12/777,144, Examiner's Answer to Appeal Brief mailed Mar. 8, 2012", 18 pgs.

"U.S. Appl. No. 12/777,144, Final Office Action mailed Aug. 17, 2011", 16 pgs.

"U.S. Appl. No. 12/777,144, Response filed Aug. 8, 2011 to Final Office Action mailed Aug. 7, 2011", 13 pgs.

"Chinese Application Serial No. 200480038176.0, Final Office Action mailed Feb. 28, 2012", w/ English Translation, 10 pgs.

"Chinese Application Serial No. 200480038176.0, Office Action mailed Aug. 2, 2011", With English Translation, 16 pgs.

"Chinese Application Serial No. 200480038176.0, Office Action Response filed Oct. 17, 2011", 2 pgs.

"International Application Serial No. PCT/US01/06709, International Search Report mailed Sep. 10, 2001", 2 pgs.

* cited by examiner

DETERMINING A COMMUNITY RATING FOR A USER USING FEEDBACK RATINGS OF RELATED USERS IN AN ELECTRONIC ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of online commerce. More particularly, the invention relates to rating systems and user feedback mechanisms for use in electronic environments, e.g., online trading environment, online shopping site, online auctioning site, online person-to-person trading site, online gaming site or other electronic environment where user feedback is provided, including those within an Internet market place community.

2. Description of the Related Art

The Internet and the World Wide Web ("Web") have changed the landscape of information delivery and affected numerous aspects of life, including commerce and entertainment. One area that has benefited from this technological development is the ability of individuals to buy and sell products within an Internet marketplace community.

Many companies operate auctions and other selling mechanisms on servers connected to the users over one or more networks, typically including the Internet. The users buying and/or selling items over these networks loosely comprise a market place community within an electronic environment. A distinction between non-electronic selling devices such as traditional garage sales and current electronic selling mechanisms is the component of anonymity inherent in electronic environment, which is not always conducive to forming a trusting environment in which two or more users wish to form a buyer-seller relationship.

To overcome some reservations about the anonymity component within the electronic marketplace community and to provide incentives for participating in transactions within the electronic marketplaces, Internet marketplaces, such as auction sites run by eBay, Inc. of San Jose, Calif. provide feedback ratings generated from feedback between users regarding trading transactions. A user's feedback rating is an indication of the user's reputation within the electronic community, and provides some indication of the trustworthiness and responsiveness of the user. A representation of a user's feedback rating is typically displayed along with a buying or selling transaction request by the user which provides the other party to the transaction an indication of the trustworthiness or past participation level of the user.

One implementation of feedback rating is illustrated in FIG. 1, in which feedback ratings 131-137 have been respectively established for marketplace users 121-127 based on votes 110 received from other users. These votes could reflect a positive recommendation and add one or more points to a user's feedback rate; or could reflect a negative experience and subtract one or more points from a user's feedback rating.

Feedback ratings provide a good mechanism for indicating a level of indicating a user's trustworthiness or past participation within an electronic commerce forum. Users desire to increase their feedback ratings because they are one indication of a user's reputation in the electronic community and some marketplace providers give awards or identify the users whose feedback ratings have reached a certain value, or some number of users with the highest feedback ratings.

However, feedback ratings do not provide a direct incentive for expanding the electronic marketplace. Needed is a new mechanism to provide an incentive for bringing new users into the electronic community.

SUMMARY OF THE INVENTION

A method and apparatus are described for determining a community rating for a particular user within an electronic community. According to one embodiment a characteristic value is maintained for each user within the electronic community. The value may be representative of any characteristic of the user that is valuable or useful within the electronic community. For example, in an electronic trading community through which goods and services are bought and sold, it is advantageous for a user to have a measure of the reputation of other users with whom the user is conducting a buying or a selling transaction. A set of relationships between the various members of the electronic community is also maintained as applicable. For example, the set of relationships might contain information about new users that were brought into the community by a particular user. A community rating is derived for a particular user of the electronic community based on a characteristic value associated with the particular user and the characteristic values associated with users related to the particular user.

Advantages and other features of the invention will be apparent to one skilled in the art from the accompanying drawings and from the following detailed description.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION OF THE INVENTION

Figure 1:
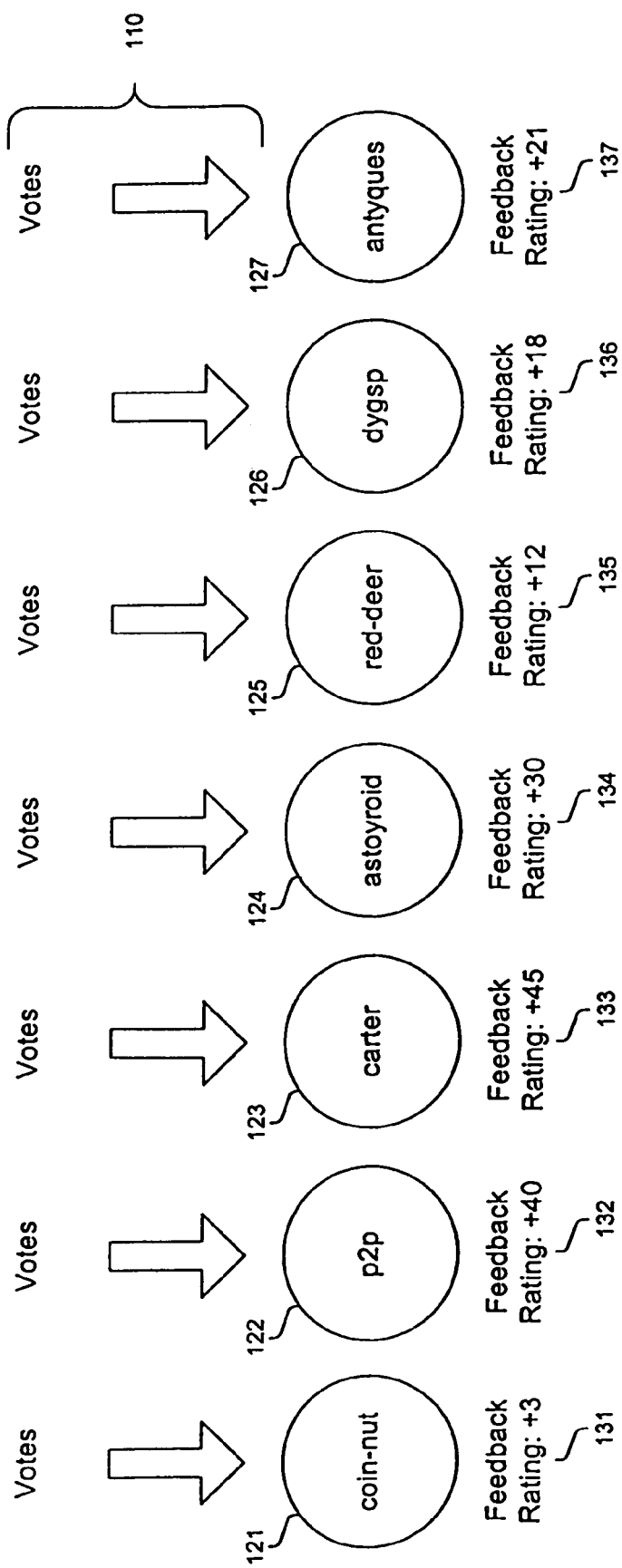
FIG. 1 is a block diagram of a prior art approach for determining feedback ratings for users in the Internet community.

A rating system is described for use in an online environment. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

As will be described in greater detail below, the present invention includes features for enhancing the online trading experience for both buyers and sellers. For example, the improved rating system may be structured to encourage existing members to refer new members thereby increasing community registrations and the pool of potential trading partners. According to one feature of the present invention, when a user attaches feedback to another user, the feedback contributes to two different ratings, a Feedback Rating and a Community Rating. A user's Community Rating is based upon the user's Feedback Rating and the Feedback Ratings of other users associated with that user. For example, a user's Community Rating may be represented by the sum of the user's Feedback Rating, the number of users the user has referred to the online trading community, and the Community Ratings of all users referred. Advantageously, in this manner, the relative value of a user's contributions to the online community can be measured in terms of the number of referrals and trustworthiness of the referred users.

In the preferred embodiment, the steps of the present invention are embodied in machine-executable instructions. The instructions can be used to cause a general-purpose or special-purpose processor, which is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a machine-readable medium computer having stored thereon a computer program comprising instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the present invention may also be downloaded as a computer program product, wherein the program may be transferred from a remote computer (e.g., a server) to a requesting computer (e.g., a client) via a communication link (e.g., a modem or network connection).

Importantly, while embodiments of the present invention will be described with respect to an online person-to-person trading environment, the method and apparatus described herein are equally relevant to other electronic environments in which ratings or values are assigned to users. For example, it is envisioned that an online gaming forum might want to provide an aggregate community rating based on the skill level of a particular gamer and fellow garners with whom he/she is associated.

For purposes of the specification, the term "characteristic value" shall be an indication, whether alphabetic, graphic, symbolic, or otherwise, of a characteristic of a user within a community or group of related communities. For example, as discussed herein, a "feedback rating," which is a characteristic value based on feedback received from other users about a user relative to transactions conducted by the user, is one type of characteristic value of a user. Other characteristic values could include, but are not limited to, measures of the user's honesty, the quality of products or services provided by the user, or the skill or expertise of the user relative to a purpose of the community. The term "community rating" shall include any indication, whether numeric, graphic or otherwise, of a characteristic of a user's relationships within a community or group of related communities. For example, a user may have a community rating based on the aggregate of all the feedback ratings of other users he referred to the community. The characteristic values or community ratings of users may be indicated in any number of ways such as a thumbs-up symbol to indicate a favorable rating or a number indicating a relative measure when compared to other users or a defined scale.

Community Rating Overview

Figure 2:
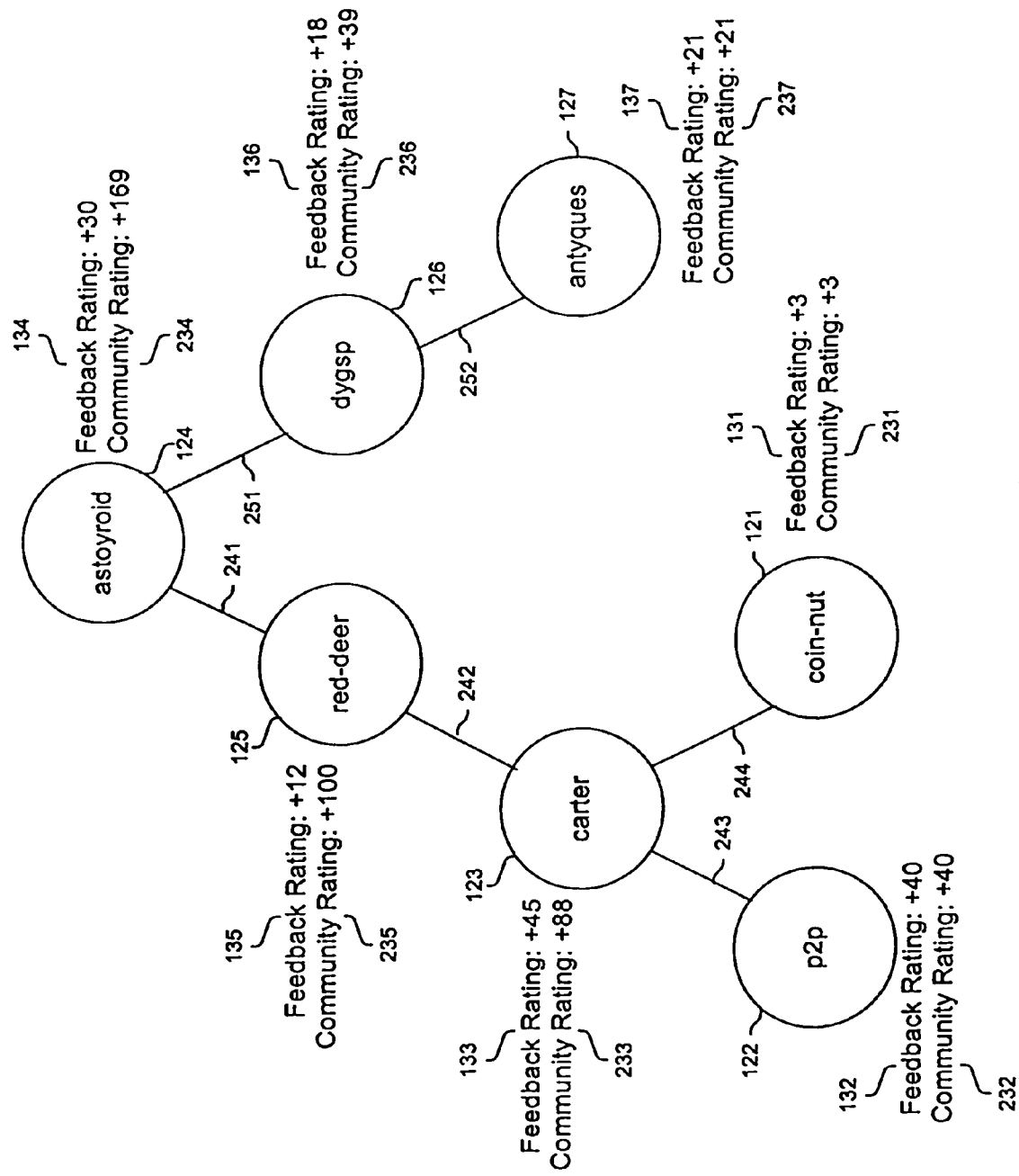
FIG. 2 is a block diagram of an exemplary embodiment of a methodology for determining community feedback ratings for users in accordance with the invention.

FIG. 2 and its discussion herein are intended to provide a description of a general approach to determining a community feedback rating for a user, with scope of the invention including many variations of this general approach. The invention provides different methodologies for manipulating the individual feedback ratings and other data elements and the relationships among the various users to derive a community rating for an individual user. Typically, a community rating for the individual user is, at least partially, determined by the number of other users the individual user brings into the electronic community, and in some instances, the reputation or feedback ratings of the other users.

User relationships are represented as an n-ary tree, where any user brought into the electronic community by sponsoring user is a child of the sponsoring user, and children of a same sponsoring user are siblings. An electronic community typically contains numerous trees of users, with the root of each tree representing a user who did not identify a sponsoring user. Embodiments of the invention allow a user to specify more than one sponsor, and these embodiments determine the community rating accordingly.

FIG. 2 illustrates one potential grouping of users 121-127 of FIG. 1, and further identifies an exemplary set of relationships 241-252 among these users 121-127 in the electronic community. For example, this configuration represents that user astoyroid 124 sponsored users red-deer 125 and dygsp 126, red-deer 125 sponsored carter 123, carter sponsored p2p 122 and coin-nut 121, and dygsp 126 sponsored antyques 127. The exemplary set of feedback ratings 131-137 for users 121-127 are further illustrated.

The various exemplary community ratings 231-237 respectively for users 121-127 are presented in FIG. 2. As previously mentioned, the invention provides for various methodologies to determine a community rating for an individual user by manipulating such factors as the feedback ratings, other data elements, and/or the relationships among the users of the electronic community. The methodology represented by the community ratings 231-237 is to aggregate the feedback rating 131-137 for the individual user with all the community ratings 231-237 of users brought into the electronic community by the individual user. In other words, by representing the relationships among users as a tree structure, the community rating 231-237 for a user is the aggregate of the feedback ratings of the user and all its descendants. In this manner, the community rating 232 of p2p 122 is its feedback rating 132; the community rating 233 for carter 123 is the sum of the feedback ratings 131-133 for users coin-nut 121, p2p 122 and carter 123; and the community rating 234 of astroyriod 124 is the sum of feedback ratings 131-137.

Computing Environment Overview

Figure 3:
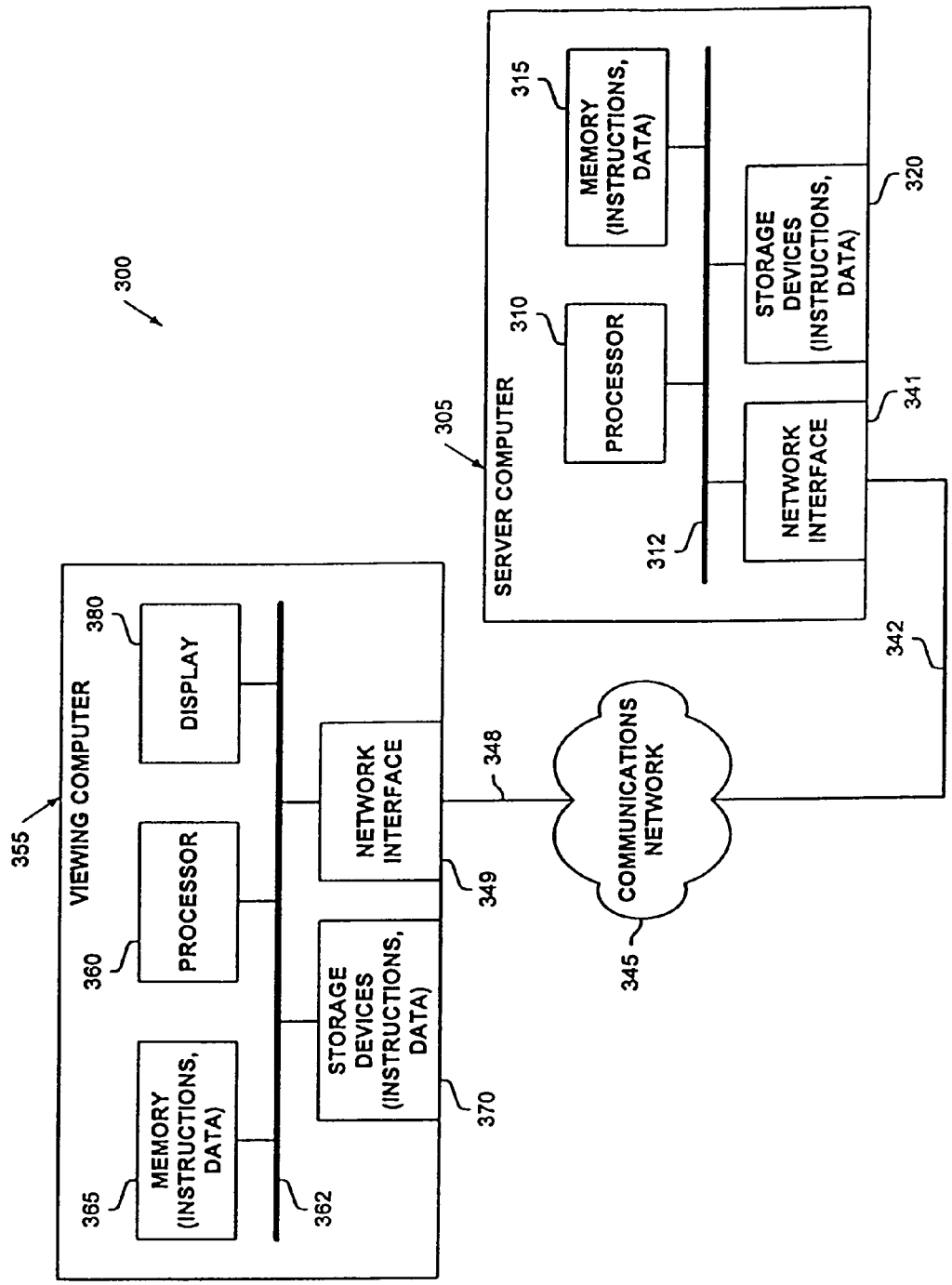
FIG. 3 is a block diagram of an exemplary operating environment in which the invention may be practiced.

FIG. 3 and its discussion herein are intended to provide a description of an exemplary computing environment in which the invention can be practiced. The invention, however, is not limited to a single computing environment. Moreover, the architecture and functionality of the invention as taught herein and would be understood by one skilled in the art is extensible to an unlimited number of computing environments and embodiments in keeping with the scope and spirit of the invention.

Illustrated are viewing computer 355, communications network 345, and server computer 305. In an embodiment of the invention, sellers and buyers use a viewing computer (or a plurality of computers) 355, and server computer (or a plurality of computers) 305 receives the feedback input from sellers and buyers and determines the community ratings for the individual users.

Viewing computer 355 typically comprises a standard computer platform or a specialized computer platform, including, but not limited to a desktop computer, a laptop computer, personal data assistant, and a handheld computer. For purposes of simplicity, only one viewing computer 355 is shown; however, the number of viewing computers supported by the invention is unbounded, and can be especially large with network 345 comprises the Internet or other wide-area networking technology. In an embodiment, viewing computer 355 comprises a processor 360, memory 365, storage devices 370, a network interface 349, and a display 380, which are electrically coupled via bus 362. Network interface 349 is connected to a communications network 345 (e.g., one or more networks, including, but not limited to the Internet, private or public telephone, cellular, wireless, satellite, cable, local area, metropolitan area and/or wide area networks) over connection 348. Memory 365 is one type of computer-readable medium, and typically comprises random access memory (RAM), read only memory (ROM), integrated circuits, and/or other memory components. Memory 365 typically stores computer-executable instructions to be executed by processor 360 and/or data which is manipulated by processor 360 for implementing functionality in accordance with the invention. Storage devices 370 are another type of computer-readable medium, and typically comprise disk drives, diskettes, networked services, tape drives, and other storage devices. Storage devices 370 typically store computer-executable instructions to be executed by processor 360 and/or data that is manipulated by processor 360 for implementing functionality in accordance with the invention. Additionally, viewing computer 355, communications network 345, and server computer 305 could be implemented in a single computer platform, with the communications network 345 being an internal information sharing mechanism such as message passing or shared memory.

Server computer 305 typically comprises one or more standard computer platforms or a specialized computer platforms (e.g., a computer platform optimized for retrieving information and sending information to clients), including, but not limited to one or more desktop computers, servers, mainframes, laptop computers, handheld computers, and personal data assistants. For simplicity, only one server computer 305 is depicted. However, the number of server computers contemplated by the invention is unbounded. When the invention is used in conjunction with a wide geographic area such as over the Internet, typically numerous viewing computers 355 and numerous serving computers 305 are used. When a plurality of serving computers 305 are used, they can be collocated, or distributed across the communications network 345. Typically, when the plurality of viewing computers are distributed across the communications network 345.

In an embodiment, server computer 305 comprises a processor 310, memory 315, storage devices 320, and a network interface 341, which are electrically coupled via bus 312. Network interface 341 is connected to the communications network 345 (e.g., Internet, email network, private or public network) over a public or private telephone, cellular, wireless, satellite, local area and/or wide area network connection 342. Memory 315 is one type of computer-readable medium, and typically comprises random access memory (RAM), read only memory (ROM), integrated circuits, and/or other memory components. Memory 315 typically stores computer-executable instructions to be executed by processor 310 and/or data, which are manipulated by processor 310 for implementing the server functionality. Storage devices 320 are another type of computer-readable medium, and typically comprise disk drives, diskettes, networked services, tape drives, and other storage devices. Storage devices 320 typically store computer-executable instructions to be executed by processor 310 and/or data which is manipulated by processor.

Architecture Overview

Figure 4:
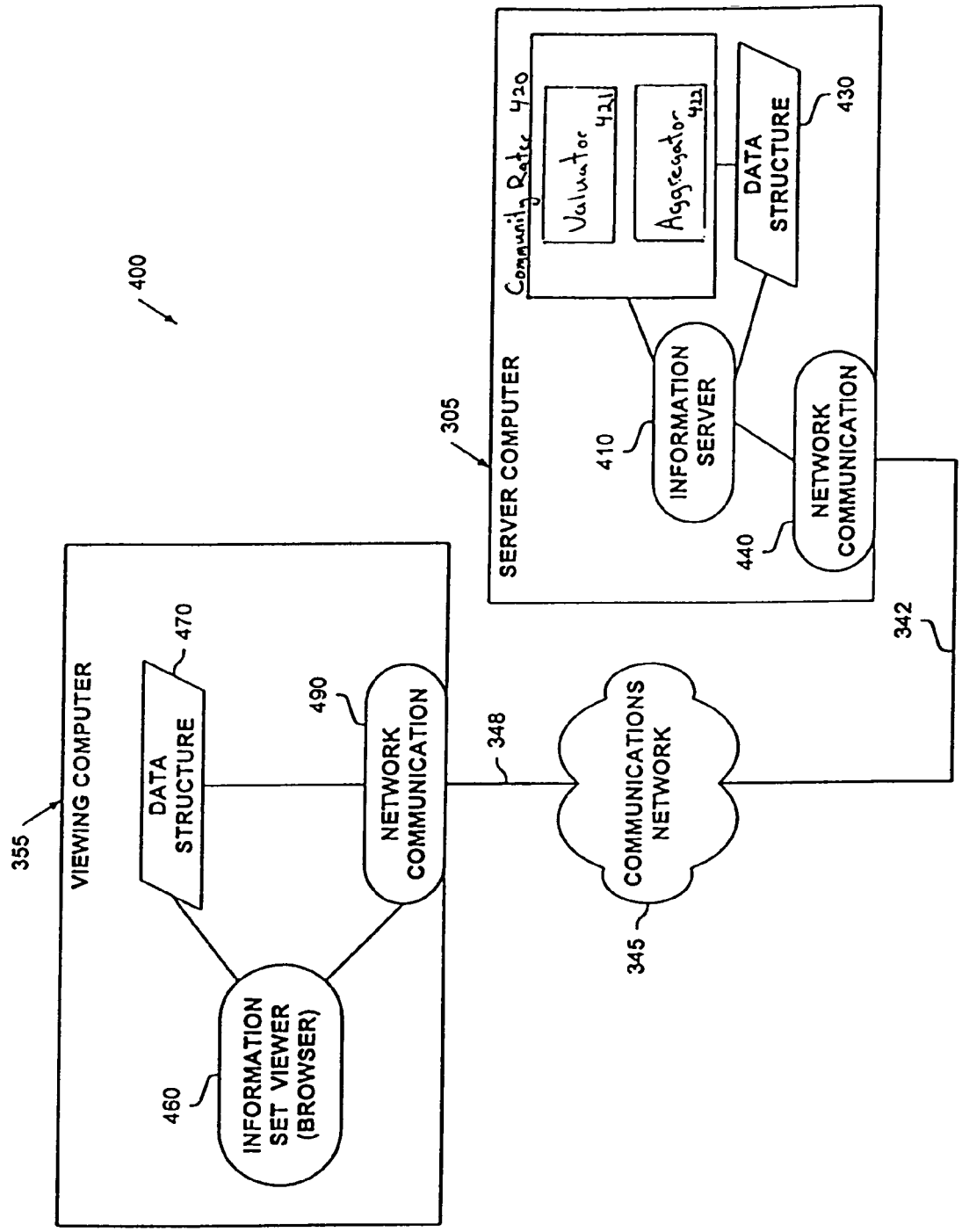
FIG. 4 is a block diagram of an exemplary operating architecture in which the invention may be practiced.

Turning now to FIG. 4, illustrated is an embodiment 400 of the invention, further illustrating an embodiment of elements 460-490 within viewing computer 355, and an embodiment of elements 410-440 within server computer 305. Viewing computer 355 typically comprises a network communication component or process 490 which interfaces with communications network 345 and enables communication with server computer 305; one or more data structures 470 for temporarily and/or permanently storing information; and an information viewer (e.g., browser) 460 for providing a user interface to a user of viewing computer 355. Server computer 305 typically comprises a network communication component or process 440 which interfaces with communications network 345 and enables communication with one or more viewing computers 305; one or more data structures 430 for temporarily and/or permanently storing information; and an information server 410 for providing information to viewing computer 305; and a community rater component or process 420 for determining the community ratings for various users.

In an embodiment, the community rater 420 is comprised of both a valuator 421 and an aggregator 422. The aggregator 422 performs a recursive routine, which aggregates the feedback ratings or characteristic values of all users in lineal succession to a patriarchal user for which a community rating is being determined. The valuator 421 combines (e.g. adds, determines a weighted average, etc), the patriarchal user's characteristic value with the aggregate value determined by the aggregator 422 to determine the patriarchal users community rating. Other embodiments of the invention are envisioned that use other methods for determining the community rating that do not specifically utilize aggregator and valuator components or routines.

Exemplary Data Structure

Figure 5A:
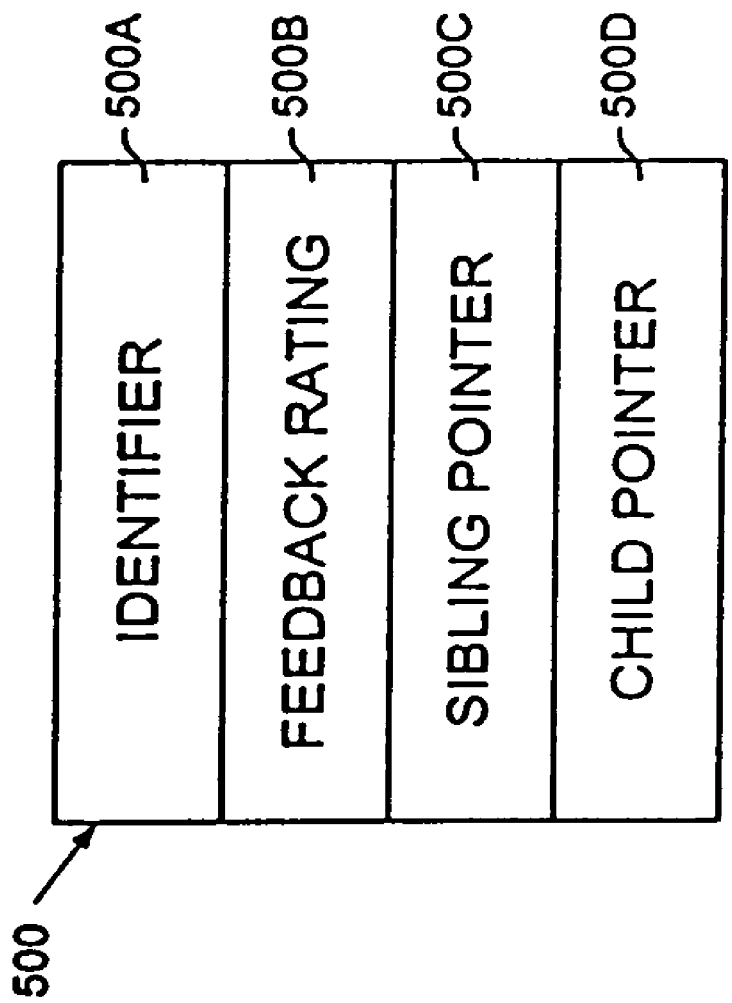
FIG. 5A is a block diagram of an exemplary data structure for maintaining a feedback rating for a user and the relationship of the user to other users within the electronic community.

FIG. 5A illustrates one of numerous data structures 500 which can be used in embodiments of the present invention for storing information about users in the electronic community and their relationships. A data structure 500 is typically used for each user and typically comprises an identifier 500A (e.g., a name of a user), a feedback rating 500B, and two relationship indicators; a closest sibling pointer 500C, and first child pointer 500D. Numerous other data structures and formats could be used, such as incorporating additional pointers or distributing the information contained in data structure 500 among several data structures and possibly representing this information in other representations (e.g., lists, arrays etc.), instead of a linked list data element.

Figure 5B:
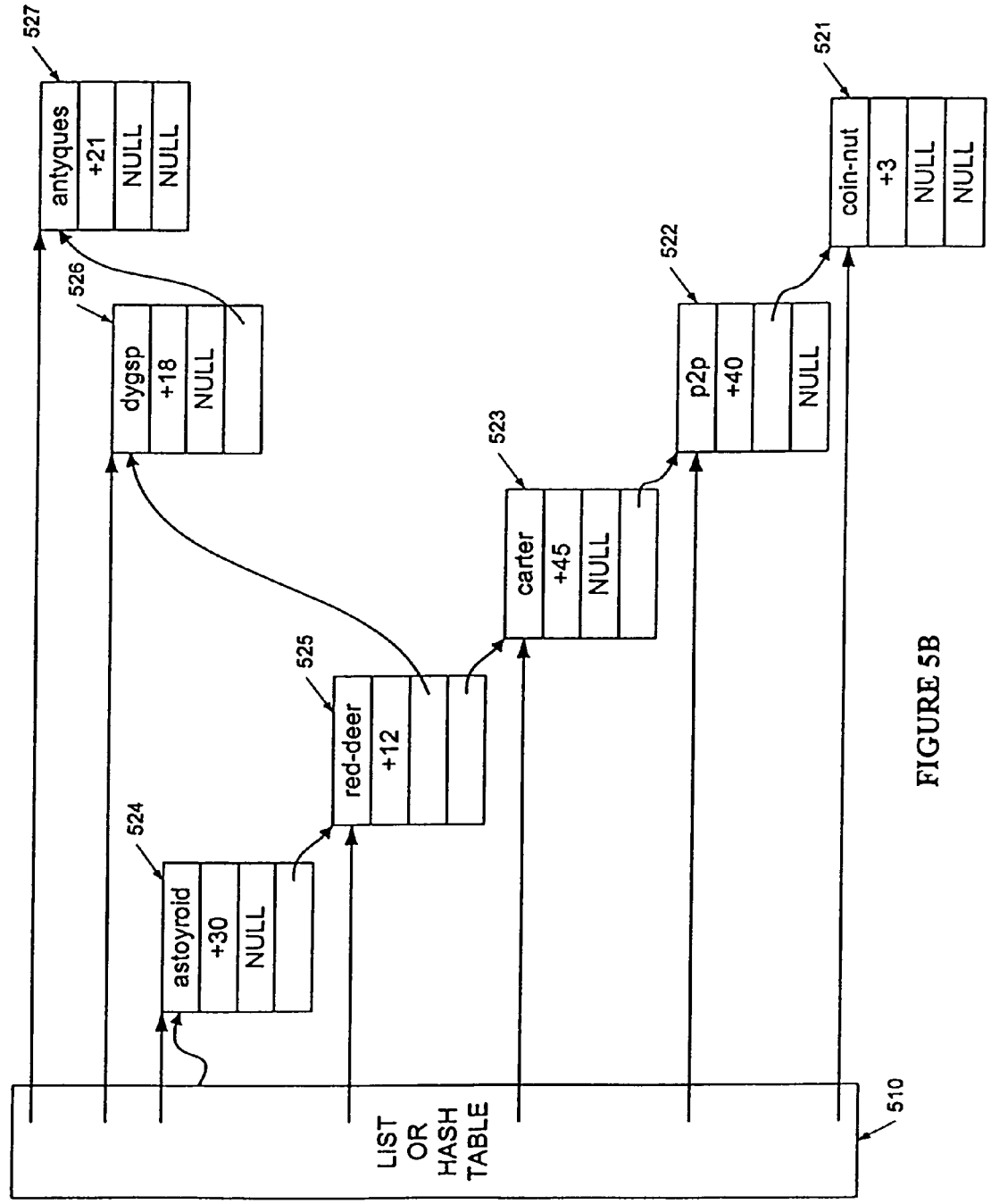
FIG. 5B is a block diagram of an exemplary configuration of populated data structures corresponding to the exemplary configuration illustrated in FIG. 2.

FIG. 5B, illustrates a block diagram showing a linked list data structure configuration for the group of users previously introduced in FIG. 2 and using the data structure 500 illustrated in FIG. 5A. Shown are seven users represented by data structures 521-527. List or hash table 510 provides direct access to any single user data structure 521-527. The interrelatedness of the data structures 521-527 is shown with arrows representing the closest sibling and first child pointers as they might be contained in each of the data structures to implement the tree structure illustrated in FIG. 2.

Community Rating Determination

Figure 6A:
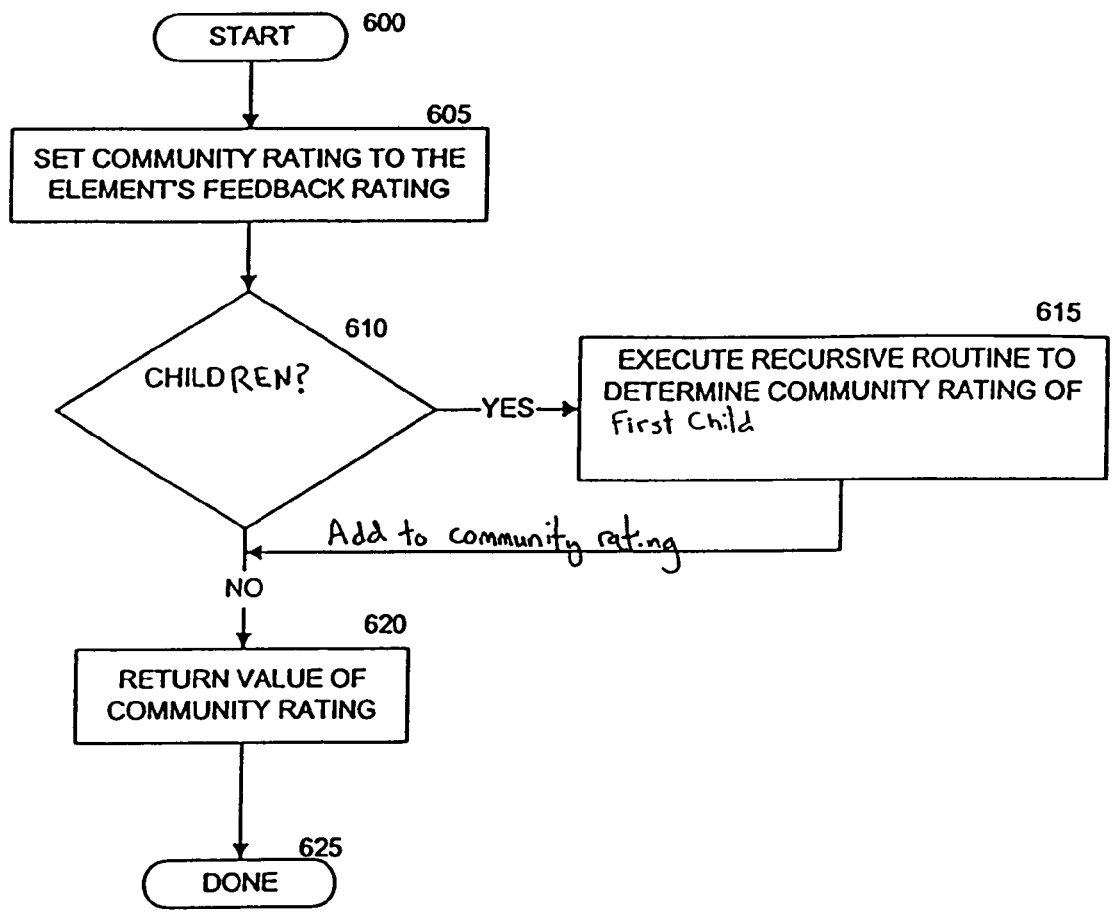
FIGS. 6A-B are high-level flow diagrams for determining a community feedback rating for a user in an embodiment of the invention.
Figure 6B:
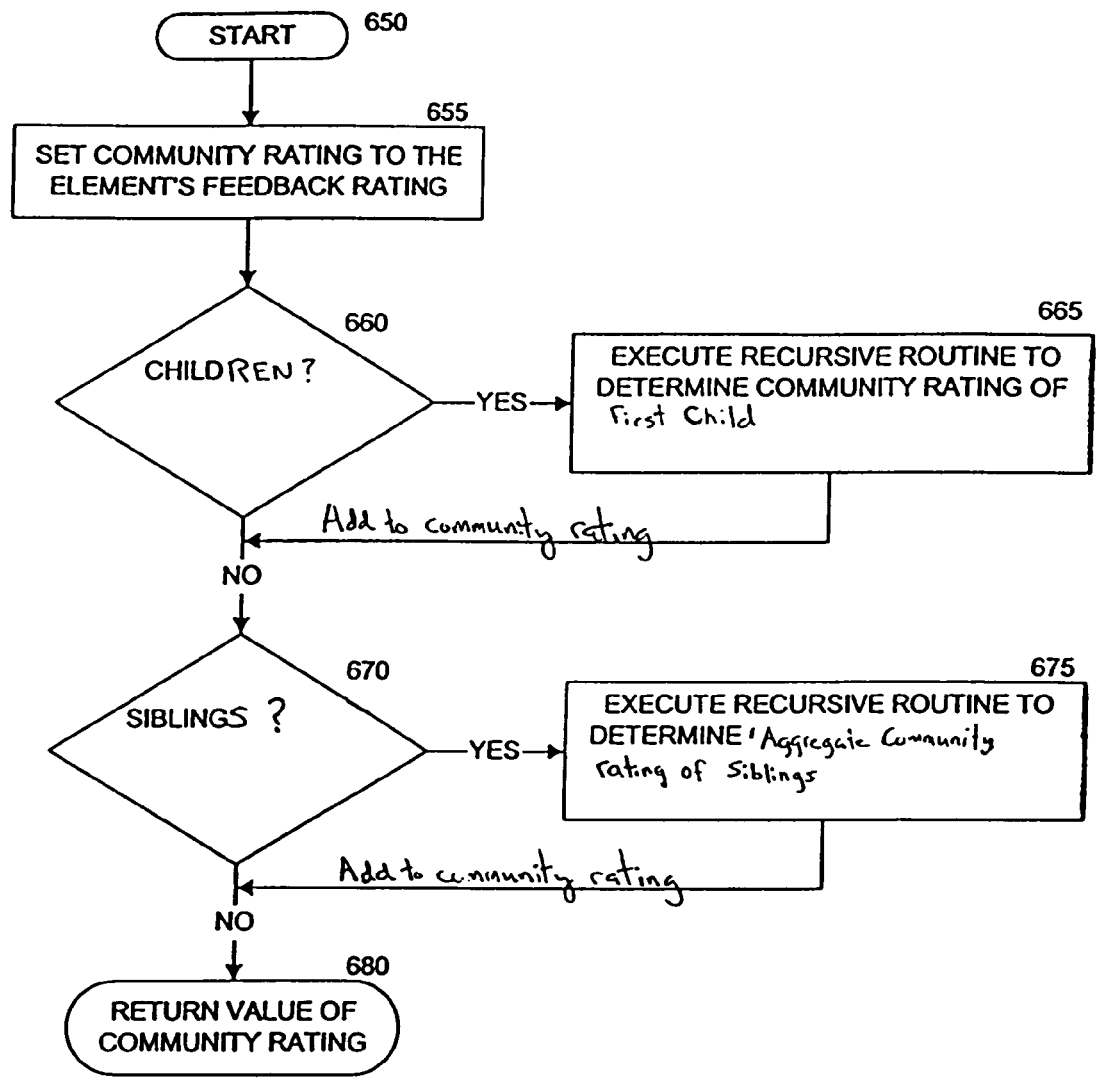

FIGS. 6A & 6B illustrate a high-level flow diagrams describing the operation for determining a community rating for an identified user within the linked data structure embodiment illustrated in FIG. 5B using the valuator 421 and aggregator 422 introduced supra. The invention provides for variations and different flow diagrams and methodologies to be used in various embodiments to conform to design decisions in implementing the invention. Moreover, the invention could be embodied in any combination of software, hardware, firmware, etc. Furthermore, the invention provides for programming the functionality required for practicing the invention using any programming technology, paradigm, and/or language that exist today or may be developed in the future; including, but not limited to parallel programming, object-oriented technology, distributed processing, multi-processing, Java, C, C++, and assembly language.

FIG. 6A is a high level flow diagram illustrating a routine that may be performed by a valuator 421 to determine a community rating for the identified user. The routine begins at step 600, and proceeds to step 605 where the community rating for the identified user is set to the identified user's feedback rating. Next, step 610 is performed to determine whether the identified user has any children. If the identified user does not, the identified user's community rating is identical to its feedback rating and the feedback rating is returned as the identified user's community rating in step 620. If the identified user has at least one child, step 615 is invoked and a recursive aggregator routine is performed as illustrated in FIG. 6b and discussed infra. After an aggregate value is returned from the recursive aggregator routine representing the first child's community rating, the aggregate value is added to the identified user's feedback rating and the value representing the identified user's community rating is returned in step 620.

FIG. 6B is a high level flow diagram illustrating a recursive routine that may be performed by an aggregator 422 to determine an aggregate value of all the feedback values of all lineal descendants of the identified user. The routine begins at step 650, and proceeds to step 655 where the community rating for the first child of the identified user is set to the first child's feedback rating. Next, in steps 660 & 665, the feedback values for all lineal descendants of the first child are aggregated and the value returned is added to the first child's community rating. If the identified user had at least two children, the sibling field in the first child's related data structure will have a pointer to the second child. Accordingly, for each n+1th child of the identified user, the nth child will have a pointer in the sibling field to that child (where n is an integer of at least 1). In steps 670 & 675 an aggregate community value for all children other than the first child of the identified user (who are all siblings of the first child) is determined and this value is added to the community rating of the first child. Finally, the aggregate value of the community rating for all the children is returned to the valuator in step 680 to be added with the feedback rating of the identified user to determine the identified user's community rating as discussed supra.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof. For instance, there are many recursive routines well known to those of ordinary skill in the art that could be used to traverse a relationship tree such as the tree shown in FIG. 2. The methodology presented supra in FIGS. 5A, 5B, 6A & 6B is therefore merely representative.

What is claimed is:

1. A computer-implemented method, comprising:

maintaining a relationship tree representing relationships among a plurality of users of an online trading community, the relationship tree including sponsorship relationships between said plurality of users including a particular user and one or more users that were referred by the particular user to said online trading community, wherein said one or more users referred by the particular user are children of said particular user and siblings to each other, and wherein said one or more users referred by the particular user have lineal descendants that include additional users that were referred by the one or more users referred by the particular user;

storing said sponsorship relationships between said plurality of users in a data structure, wherein the data structure for the particular user contains a pointer to at least one of said plurality of users;

associating, by a first processor, one or more characteristic values with said plurality of users including said particular user, said one or more users referred by the particular user, and said lineal descendants, the one or more characteristic values representing an individual feedback rating associated with each of said plurality of users and being established based on votes from other users of the plurality of users of the online trading community;

deriving, by a second processor, a community rating uniquely corresponding to said particular user by aggregating said individual feedback rating associated with the particular user, said individual feedback ratings associated with one or more users referred by the particular user to the online trading community, and said individual feedback ratings associated with said lineal descendants, wherein deriving is performed utilizing the pointer in said data structure; and storing the community rating uniquely corresponding to the particular user in a storage device.

2. The method of claim 1, wherein the online trading community comprises an electronic community to trade merchandise over a network, wherein the trading of the merchandise comprises at least one of buying or selling of goods or services.

3. The method of claim 2, wherein the network comprises the Internet.

4. The method of claim 1, wherein the one or more characteristic values comprise a feedback value based on feedback concerning the particular user received from said other users of the plurality of users in the electronic community.

5. The method of claim 4, wherein the other users of the plurality of users comprise users that have previously traded with the particular user.

6. The method of claim 1, wherein the relationship tree includes one or more n-ary trees.

7. The method of claim 1, wherein the pointer is to the at least one user of the plurality that was referred by the particular user.

8. The method of claim 1, wherein the deriving of the community rating for the particular user is performed utilizing a recursive routine.

9. The method of claim 1, wherein the community rating for the particular user represent a reputation value corresponding to the particular user.

10. A machine-readable medium having stored thereon data representing sets of instructions which, when executed by a machine, cause the machine to:
maintain a relationship tree representing relationships among a plurality of users of an online trading community, the relationship tree including sponsorship relationships between said plurality of users including a particular user and one or more users that were referred by the particular user to said online trading community, wherein said one or more users referred by the particular user are children of said particular user and siblings to each other, and wherein said one or more users referred by the particular user have lineal descendants that include additional users that were referred by the one or more users referred by the particular user;
store said sponsorship relationships between said plurality of users in a data structure, wherein the data structure for the particular user contains a pointer to at least one of said plurality of users;
associate one or more characteristic values with said plurality of users including said particular user, said one or more users referred by the particular user, and said lineal descendants, the one or more characteristic values representing an individual feedback rating associated with each of said plurality of users and being established based on votes from other users of the plurality of users of the online trading community;
derive a community rating uniquely corresponding to said particular user by aggregating said individual feedback rating associated with the particular user, said individual feedback ratings associated with one or more users referred by the particular user to the online trading community, and said individual feedback ratings associated with said lineal descendants, wherein deriving is performed utilizing the pointer in said data structure.

11. The machine-readable medium of claim 10, wherein the online trading community comprises an electronic community buying and selling of merchandise over a network, the merchandise having at least one of goods and services.

12. The machine-readable medium of claim 11, wherein the one or more characteristic values comprise a feedback value based on feedback concerning the particular user received from said other users of the plurality of users in the electronic community.

13. A computer-implemented method, comprising:
associating, by a first processor, a first characteristic value with a first user of a plurality of users within an online trading community, the first characteristic value being obtained for the first user utilizing a first feedback value based on feedback received concerning the first user from other users of the plurality of users;
associating, by a second processor, a second characteristic value with a second user of the plurality of users, wherein the second user is referred to the online trading community by the first user, the second characteristic value being obtained for the second user utilizing a second feedback value based on feedback received concerning the second user from said other users of the plurality of users;
associating a third characteristic value with a third user of the plurality of users, wherein the third user is referred to the online trading community by the second user, the third characteristic value is obtained for the third user by utilizing a third feedback value based on feedback received concerning the third user from said other users of the plurality of users;
maintaining a relationship tree representing relationships among said plurality of users, the relationship tree including sponsorship relationships between said plurality of users including said first user, said second user, and said third user, wherein said second user and one or more users referred by the first user to the online trading community are children of said first user and siblings to each other and wherein said second user has lineal descendants that include one or more users that were referred by the second user to the online community, including the third user;
storing said sponsorship relationships between said plurality of users in a data structure, wherein the data structure for the particular user contains a pointer to at least one of said plurality of users;
deriving, by a third processor, a first community rating for the first user by aggregating the first feedback value, the second feedback value, and the third feedback value, wherein deriving is performed utilizing the pointer in said data structure; and
storing the first community rating for the first user in a storage device.

14. The method of claim 13, further comprising:
deriving a second community rating for the second user by utilizing an aggregation of the second characteristic value and the third characteristic value.

15. The method of claim 13, wherein as a child of the first user, the second user is a lineal descendent of the first user.

16. The method of claim 15, wherein the relationship tree comprises a nexus between the first user, the second user, and other users referred by at least one of the first user and the second user.

17. The method of claim 13, wherein the first community rating comprises first reputation value corresponding to the first user, and the second community rating comprises second reputation value corresponding to the second user.

18. A machine-readable medium having stored thereon data representing sets of instructions which, when executed by a machine, cause the machine to:
associate a first characteristic value with a first user of a plurality of users within an online trading community, the first characteristic value being obtained for the first user utilizing a first feedback value based on feedback received concerning the first user from other users of the plurality of users;
associate a second characteristic value with a second user of the plurality of users, wherein the second user is referred to the online trading community by the first user, the second characteristic value being obtained for the second user utilizing a second feedback value based on feedback received concerning the second user from said other users of the plurality of users;
associate a third characteristic value with a third user of the plurality of users, wherein the third user is referred to the online trading community by the second user, the third characteristic value is obtained for the third user by utilizing a third feedback value based on feedback received concerning the third user from said other users of the plurality of users;
maintain a relationship tree representing relationships among said plurality of users, the relationship tree including sponsorship relationships between said plurality of users including said first user, said second user, and said third user, wherein said second user and one or more users referred by the first user to the online trading community are children of said first user and siblings to each other and wherein said second user has lineal descendants that include one or more users that were referred by the second user to the online community, including the third user;

store said sponsorship relationships between said plurality of users in a data structure, wherein the data structure for the particular user contains a pointer to at least one of said plurality of users;

derive a first community rating for the first user by aggregating the first feedback value, the second feedback value, and the third feedback value, wherein deriving is performed utilizing the pointer in said data structure.

19. The machine-readable medium of claim 18, wherein the relationship tree comprises a referral relationship having the second user, who is a child of the first user, as a lineal descendent of the first user.

20. The machine-readable medium of claim 18, wherein the relationship tree comprises a nexus between the first user, the second user, and other users referred by at least one of the first user and the second user.

21. The machine-readable medium of claim 18, wherein the first community rating comprises first reputation value corresponding to the first user, and the second community rating comprises second reputation value corresponding to the second user.

22. A system comprising:
a first storage medium; and
a first computer coupled with the first storage medium, the first computer to:
maintain a relationship tree representing relationships among a plurality of users of an online trading community, the relationship tree including sponsorship relationships between said plurality of users including a particular user and one or more users that were referred by the particular user to said online trading community, wherein said one or more users referred by the particular user are children of said particular user and siblings to each other, and wherein said one or more users referred by the particular user have lineal descendants that include additional users that were referred by the one or more users referred by the particular user;
store said sponsorship relationships between said plurality of users in a data structure, wherein the data structure for the particular user contains a pointer to at least one of said plurality of users;
associate one or more characteristic values with said plurality of users including said particular user, said one or more users referred by the particular user, and said lineal descendants, the one or more characteristic values representing an individual feedback rating associated with each of said plurality of users and being established based on votes from other users of the plurality of users of the online trading community;
derive a community rating uniquely corresponding to said particular user by aggregating said individual feedback rating associated with the particular user, said individual feedback ratings associated with one or more users referred by the particular user to the online trading community, and said individual feedback ratings associated with said lineal descendants, wherein deriving is performed utilizing the pointer in said data structure.

23. The system of claim 22, further comprising:
a second storage medium; and
a second computer coupled with the second storage medium and the first computer via a network interface, the second computer to receive feedback concerning the particular user from said other users of the plurality of users, generate a feedback value corresponding to the particular user based on the feedback, and transmit the feedback value to the first computer.

24. The system of claim 23, wherein the first computer comprises a server computer and the second computer comprises a client computer.

25. The system of claim 22, wherein the first computer is further to determine the one or more characteristic values based on the feedback value corresponding to the particular user.

26. The system of claim 23, wherein the second computer is accessed by the plurality of users to trade merchandise, wherein the trading of the merchandise comprises buying or selling of goods or services.

27. The system of claim 23, wherein the network interface is to couple the first computer with the second computer over a network having the Internet.

28. The machine-readable medium of claim 18, wherein the sets of instructions which, when executed by the machine, further cause the machine to:
derive a second community rating for the second user by utilizing an aggregation of the second characteristic value and the third characteristic value.

29. A system, comprising:
a first storage medium; and
a first computer coupled with the first storage medium, the first computer to:
associate a first characteristic value with a first user of a plurality of users within an online trading community, the first characteristic value being obtained for the first user utilizing a first feedback value based on feedback received concerning the first user from other users of the plurality of users;
associate a second characteristic value with a second user of the plurality of users, wherein the second user is referred to the online trading community by the first user, the second characteristic value being obtained for the second user utilizing a second feedback value based on feedback received concerning the second user from said other users of the plurality of users;
associate a third characteristic value with a third user of the plurality of users, wherein the third user is referred to the online trading community by the second user, the third characteristic value is obtained for the third user by utilizing a third feedback value based on feedback received concerning the third user from said other users of the plurality of users;
maintain a relationship tree representing relationships among said plurality of users, the relationship tree including sponsorship relationships between said plurality of users including said first user, said second user, and said third user, wherein said second user and one or more users referred by the first user to the online trading community are children of said first user and siblings to each other and wherein said second user has lineal descendants that include one or more users that were referred by the second user to the online community, including the third user;

store said sponsorship relationships between said plurality of users in a data structure, wherein the data structure for the particular user contains a pointer to at least one of said plurality of users;

derive a first community rating for the first user by aggregating the first feedback value, the second feedback value, and the third feedback value, wherein deriving is performed utilizing the pointer in said data structure.

30. The system of claim 29, further comprising:
a second storage medium; and
a second computer coupled with the second storage medium and the first computer via a network interface, the second computer to receive feedback concerning the first user from said other users of the plurality of users, generate a feedback value corresponding to the first user based on the feedback, and transmit the feedback value to the first computer.

31. The system of claim 30, wherein the first computer comprises a server computer and the second computer comprises a client computer.

32. The system of claim 29, wherein the first computer is further to perform a recursive routine when determining the community rating for the first user.

33. The system of claim 29, wherein the one or more characteristic values and the community rating comprise numeric values.

34. The system of claim 30, wherein the second computer is accessed by the plurality of users to trade merchandise, wherein the trading of the merchandise comprises buying or selling of goods or services.

\* \* \* \* \*

UNITED STATES PATENT AND TRADEMARK OFFICE
CERTIFICATE OF CORRECTION

PATENT NO. : 8,290,809 B1
APPLICATION NO. : 09/503960
DATED : October 16, 2012
INVENTOR(S) : Ratterman et al.

Page 1 of 14

It is certified that error appears in the above-identified patent and that said Letters Patent is hereby corrected as shown below:

On the title page, in column 2, item 56, under "Other Publications", line 3, after "Wire", delete "." and insert --,--, therefor On title page 3, in column 1, item 56, under "Other Publications", line 1, after "Crystal", delete "." and insert --,--, therefor On title page 3, in column 1, item 56, under "Other Publications", line 5, after "Donna", delete "." and insert --,--, therefor On title page 3, in column 1, item 56, under "Other Publications", line 7, delete "Morton Thanning." and insert --Morton, Thanning.--, therefor On title page 3, in column 1, item 56, under "Other Publications", line 13, after "Nick", delete "." and insert --,--, therefor On title page 3, in column 1, item 56, under "Other Publications", line 16, after "Jakob", delete "." and insert --,--, therefor On title page 3, in column 1, item 56, under "Other Publications", line 18, after "Alfred", delete ";" and insert --,--, therefor On title page 3, in column 1, item 56, under "Other Publications", line 18, after "Ullman", delete "." and insert --,--, therefor On title page 3, in column 1, item 56, under "Other Publications", line 29, delete "TW;" and insert --T. W.,--, therefor On title page 3, in column 1, item 56, under "Other Publications", line 29, delete "J;" and insert --J.,--, therefor Signed and Sealed this
Twenty-ninth Day of October, 2013

Teresa Stanek Rea
*Deputy Director of the United States Patent and Trademark Office*

CERTIFICATE OF CORRECTION (continued)
U.S. Pat. No. 8,290,809 B1

On title page 3, in column 1, item 56, under "Other Publications", line 29, delete "Electrnic" and insert --Electronic--, therefor On title page 3, in column 1, item 56, under "Other Publications", line 32, delete "A;" and insert --A.,--, therefor On title page 3, in column 1, item 56, under "Other Publications", line 32, delete "J," and insert --J.,--, therefor On title page 3, in column 1, item 56, under "Other Publications", line 37, delete "BS," and insert --B. S.,--, therefor On title page 3, in column 1, item 56, under "Other Publications", line 40, delete "TE;" and insert --T. E.,--, therefor On title page 3, in column 1, item 56, under "Other Publications", line 41, delete "Reaearch" and insert --Research--, therefor On title page 3, in column 1, item 56, under "Other Publications", line 43, delete "MN;" and insert --M. N.,--, therefor On title page 3, in column 1, item 56, under "Other Publications", line 43, delete "BD," and insert --B. D.,--, therefor On title page 3, in column 1, item 56, under "Other Publications", line 46, delete "DL;" and insert --D. L.,--, therefor On title page 3, in column 1, item 56, under "Other Publications", line 46, delete "SS," and insert --S. S.,--, therefor On title page 3, in column 2, item 56, under "Other Publications", line 1, delete "CM;" and insert --C. M.,--, therefor On title page 3, in column 2, item 56, under "Other Publications", line 13, delete "E;" and insert --E.,--, therefor On title page 3, in column 2, item 56, under "Other Publications", line 27, delete "BF.," and insert --B. F.,--, therefor On title page 3, in column 2, item 56, under "Other Publications", line 28, delete "Electrnic" and insert --Electronic--, therefor On title page 3, in column 2, item 56, under "Other Publications", line 30, delete "I;" and insert --I.,--, therefor On title page 3, in column 2, item 56, under "Other Publications", line 35, delete "Martin.," and insert --Martin,--, therefor On title page 3, in column 2, item 56, under "Other Publications", line 37, delete "E;" and insert --E.,--, therefor On title page 3, in column 2, item 56, under "Other Publications", line 39, delete "HG.," and insert --H. G.,--, therefor On title page 3, in column 2, item 56, under "Other Publications", line 45, delete "Vladimir.," and insert --Vladimir,--, therefor On title page 3, in column 2, item 56, under "Other Publications", line 46, delete "Electrnic" and insert --Electronic--, therefor On title page 3, in column 2, item 56, under "Other Publications", line 49, delete "Paul et al." and insert --Paul, et al.,--, therefor On title page 3, in column 2, item 56, under "Other Publications", line 49, before "Reputation", insert --"--, therefor On title page 3, in column 2, item 56, under "Other Publications", line 49, delete "Systems." and insert --Systems,"--, therefor On title page 3, in column 2, item 56, under "Other Publications", line 50, delete "v43,n12," and insert --vol. 43, No. 12,--, therefor On title page 3, in column 2, item 56, under "Other Publications", line 51, before "Mediapraise", insert --"--, therefor On title page 3, in column 2, item 56, under "Other Publications", line 52, delete "problem." and insert --problem",--, therefor On title page 3, in column 2, item 56, under "Other Publications", line 54, after "Jim", delete "." and insert --,--, therefor On title page 3, in column 2, item 56, under "Other Publications", line 54, before "Visual", insert --"--, therefor On title page 3, in column 2, item 56, under "Other Publications", line 54, delete "fun." and insert --fun",--, therefor On title page 3, in column 2, item 56, under "Other Publications", line 56, delete "vAN" and insert --Van--, therefor

CERTIFICATE OF CORRECTION (continued)
U.S. Pat. No. 8,290,809 B1

On title page 3, in column 2, item 56, under "Other Publications", line 59, after "Martin", delete "." and insert --,--, therefor On title page 3, in column 2, item 56, under "Other Publications", line 59, before "A", insert --"--, therefor On title page 3, in column 2, item 56, under "Other Publications", line 59, delete "e-Bidding." and insert --e-Bidding,"--, therefor On title page 3, in column 2, item 56, under "Other Publications", line 63, after "Nick", delete "." and insert --,--, therefor On title page 3, in column 2, item 56, under "Other Publications", line 63, before "Epinions", insert --"--, therefor On title page 3, in column 2, item 56, under "Other Publications", line 63, delete "Oniline" and insert --Online--, therefor On title page 3, in column 2, item 56, under "Other Publications", line 64, delete "Trust.", insert --Trust,"--, therefor On title page 3, in column 2, item 56, under "Other Publications", line 65, after "Jacob", delete "." and insert --,--, therefor On title page 3, in column 2, item 56, under "Other Publications", line 65, before "Reputation", insert --"--, therefor On title page 3, in column 2, item 56, under "Other Publications", line 65, delete "Happening." and insert --Happening,"--, therefor On title page 3, in column 2, item 56, under "Other Publications", line 66, after "Nielsen, Jacob. Reputation Managers Are Happening. Alertbox., Sep. 5, 1999,", insert --¶--, therefor On title page 4, in column 1, item 56, under "Other Publications", line 10, delete "A.J." and insert --A. J.--, therefor On title page 4, in column 1, item 56, under "Other Publications", line 10, before "Innovations" insert --"--, therefor On title page 4, in column 1, item 56, under "Other Publications", line 10, after "International,", insert --"--, therefor On title page 4, in column 1, item 56, under "Other Publications", line 33, delete "Beth Lipton Krigel" and insert --Beth, Lipton, Krigel,--, therefor On title page 4, in column 1, item 56, under "Other Publications", line 33, before "Big", insert --"--, therefor On title page 4, in column 1, item 56, under "Other Publications", line 33, after "News,", insert --"--, therefor On title page 4, in column 1, item 56, under "Other Publications", line 36, before "Consumer", insert --"--, therefor On title page 4, in column 1, item 56, under "Other Publications", line 36, after "win,", insert --"--, therefor On title page 4, in column 1, item 56, under "Other Publications", line 39, before "Productopia", insert --"--, therefor On title page 4, in column 1, item 56, under "Other Publications", line 39, delete "launches-product" and insert --launches product--, therefor On title page 4, in column 1, item 56, under "Other Publications", line 39, after "site,", insert --"--, therefor On title page 4, in column 1, item 56, under "Other Publications", line 42, before "NAD", insert --"--, therefor On title page 4, in column 1, item 56, under "Other Publications", line 42, after "Machine", insert --,"--, therefor On title page 4, in column 1, item 56, under "Other Publications", line 45, after "2003)", insert --,--, therefor On title page 4, in column 1, item 56, under "Other Publications", line 46, before "Welcome", insert --"--, therefor On title page 4, in column 1, item 56, under "Other Publications", line 47, after "information,", insert --"--, therefor On title page 4, in column 1, item 56, under "Other Publications", line 50, before "Have", insert --"--, therefor On title page 4, in column 1, item 56, under "Other Publications", line 50, after "Epionion?,", insert --"--, therefor On title page 4, in column 1, item 56, under "Other Publications", line 57, delete "(1998-2000),3 pages." and insert --(1998-2000), 3 pages.--, therefor CERTIFICATE OF CORRECTION (continued)
U.S. Pat. No. 8,290,809 B1

On title page 4, in column 1, item 56, under "Other Publications", line 61, delete "productasp" and insert --product.asp--, therefor On title page 4, in column 1, item 56, under "Other Publications", line 67, delete "Michael J.," and insert --Michael, J.,--, therefor On title page 4, in column 1, item 56, under "Other Publications", line 69, delete "1999),2" and insert --1999, 2--, therefor On title page 4, in column 2, item 56, under "Other Publications", line 11, delete "helo" and insert --help--, therefor On title page 4, in column 2, item 56, under "Other Publications", line 12, before "Wayback", insert --"--, therefor On title page 4, in column 2, item 56, under "Other Publications", line 12, after "archive", insert --"--, therefor On title page 4, in column 2, item 56, under "Other Publications", line 12, delete "1999),3 pages." and insert --1999), 3 pages.--, therefor On title page 4, in column 2, item 56, under "Other Publications", line 18, delete "Kurt ," and insert --Kurt,--, therefor On title page 4, in column 2, item 56, under "Other Publications", line 18, delete "Indusive" and insert --Inclusive--, therefor On title page 4, in column 2, item 56, under "Other Publications", line 21, delete "Alexandra ," and insert --Alexandra,--, therefor On title page 4, in column 2, item 56, under "Other Publications", line 23, delete "1999),2 pgs." and insert --1999), 2 pgs.--, therefor On title page 4, in column 2, item 56, under "Other Publications", line 27, delete "Robert A.," and insert --Robert, A.,--, therefor On title page 4, in column 2, item 56, under "Other Publications", line 28, delete "Riverside." and insert --Riverside,--, therefor On title page 4, in column 2, item 56, under "Other Publications", line 30, delete "Ken ," and insert --Ken,--, therefor On title page 4, in column 2, item 56, under "Other Publications", line 32, delete "firstmonday." and insert --first monday.--, therefor

CERTIFICATE OF CORRECTION (continued)
U.S. Pat. No. 8,290,809 B1

On title page 4, in column 2, item 56, under "Other Publications", line 34, delete "Jodi ," and insert --Jodi,--, therefor On title page 4, in column 2, item 56, under "Other Publications", line 36, delete "(Jul. 8, 1998),2 pages." and insert --(Jul. 8, 1996), 2 pages.--, therefor On title page 4, in column 2, item 56, under "Other Publications", line 37, delete "Lik ," and insert --Lik,--, therefor On title page 4, in column 2, item 56, under "Other Publications", line 39, delete "(2002),9 Pages." and insert --(2002), 9 pages.--, therefor On title page 4, in column 2, item 56, under "Other Publications", line 40, delete "Josep M.," and insert --Josep, M.,--, therefor On title page 4, in column 2, item 56, under "Other Publications", line 43, delete "(2002),8 Pages." and insert --(2002), 8 pages.--, therefor On title page 4, in column 2, item 56, under "Other Publications", line 44, delete "Lars ," and insert --Lars,--, therefor On title page 4, in column 2, item 56, under "Other Publications", line 47, delete "1998," and insert --1996,--, therefor On title page 4, in column 2, item 56, under "Other Publications", line 48, delete "Jordi ," and insert --Jordi,--, therefor On title page 4, in column 2, item 56, under "Other Publications", line 51, delete "Catalonia." and insert --Catalonia,--, therefor On title page 4, in column 2, item 56, under "Other Publications", line 52, delete "Nathan ," and insert --Nathan,--, therefor On title page 4, in column 2, item 56, under "Other Publications", line 54, delete "(Jun. 2003)." and insert --(Jun. 2003),--, therefor On title page 4, in column 2, item 56, under "Other Publications", line 55, delete "Barry ," and insert --Barry,--, therefor On title page 4, in column 2, item 56, under "Other Publications", line 56, delete "Kiester" and insert --Kiesler--, therefor On title page 4, in column 2, item 56, under "Other Publications", line 57, delete "(1997),26 Pages." and insert --(1997), 26 pages.--, therefor On title page 4, in column 2, item 56, under "Other Publications", line 58, delete "Bin ," and insert --Bin,--, therefor On title page 4, in column 2, item 56, under "Other Publications", line 61, delete "(2000),154-165." and insert --(2000), 154-165.--, therefor On title page 4, in column 2, item 56, under "Other Publications", line 62, before "www", insert --"--, therefor On title page 4, in column 2, item 56, under "Other Publications", line 63, after "Machine", insert --"--, therefor On title page 4, in column 2, item 56, under "Other Publications", line 65, before "http:", insert --"--, therefor On title page 4, in column 2, item 56, under "Other Publications", line 67, after "www.ebay.com", insert --"--, therefor On title page 5, in column 1, item 56, under "Other Publications", line 7, after "09/412,893", insert --,--, therefor On title page 5, in column 1, item 56, under "Other Publications", line 9, after "09/412,893", insert --,--, therefor On title page 5, in column 1, item 56, under "Other Publications", line 11, delete "09/412,893 final office action" and insert --09/412,893, Final Office Action--, therefor On title page 5, in column 1, item 56, under "Other Publications", line 13, delete "09/412,893 final office action" and insert --09/412,893, Final Office Action--, therefor On title page 5, in column 1, item 56, under "Other Publications", line 15, after "09/412,893", insert --,--, therefor On title page 5, in column 1, item 56, under "Other Publications", line 15, delete "office action" and insert --Office Action--, therefor On title page 5, in column 1, item 56, under "Other Publications", line 17, delete "09/412,893 final office action" and insert --09/412,893, Final Office Action--, therefor On title page 5, in column 1, item 56, under "Other Publications", line 19, delete "09/412,893 non final office action" and insert --09/412,893, Non Final Office Action--, therefor On title page 5, in column 1, item 56, under "Other Publications", line 21, delete "09/412,893 non final office action" and insert --09/412,893, Non Final Office Action--, therefor On title page 5, in column 1, item 56, under "Other Publications", line 23, delete "09/412,893 non final office action" and insert --09/412,893, Non Final Office Action--, therefor On title page 5, in column 1, item 56, under "Other Publications", line 25, delete "09/412,893 non final office action" and insert --09/412,893, Non Final Office Action--, therefor On title page 5, in column 1, item 56, under "Other Publications", line 27, after "09/412,893", insert --,--, therefor On title page 5, in column 1, item 56, under "Other Publications", line 27-28, delete "non final office action" and insert --Non Final Office Action--, therefor On title page 5, in column 1, item 56, under "Other Publications", line 29, after "09/412,893", insert --,--, therefor On title page 5, in column 1, item 56, under "Other Publications", line 29-30, delete "non final office action" and insert --to Non Final Office Action--, therefor On title page 5, in column 1, item 56, under "Other Publications", line 31, after "09/412,893", insert --,--, therefor On title page 5, in column 1, item 56, under "Other Publications", line 31-32, delete "final office action" and insert --to Final Office Action--, therefor On title page 5, in column 1, item 56, under "Other Publications", line 33, after "09/412,893", insert --,--, therefor On title page 5, in column 1, item 56, under "Other Publications", line 33-34, delete "final office action" and insert --to Final Office Action--, therefor On title page 5, in column 1, item 56, under "Other Publications", line 35, after "09/412,893", insert --,--, therefor On title page 5, in column 1, item 56, under "Other Publications", line 35-36, delete "non-final office action" and insert --to Non Final Office Action--, therefor On title page 5, in column 1, item 56, under "Other Publications", line 37, after "09/412,893", insert --,--, therefor On title page 5, in column 1, item 56, under "Other Publications", line 37-38, delete "final office action" and insert --to Final Office Action--, therefor On title page 5, in column 1, item 56, under "Other Publications", line 39, after "09/412,893", insert --,--, therefor On title page 5, in column 1, item 56, under "Other Publications", line 39-40, delete "non-final office action" and insert --to Non Final Office Action--, therefor On title page 5, in column 1, item 56, under "Other Publications", line 41, after "09/515,575", insert --,--, therefor On title page 5, in column 1, item 56, under "Other Publications", line 47, after "09/515,575", insert --,--, therefor On title page 5, in column 1, item 56, under "Other Publications", line 49, after "09/515,575", insert --,--, therefor On title page 5, in column 1, item 56, under "Other Publications", line 51, after "09/515,575", insert --,--, therefor On title page 5, in column 1, item 56, under "Other Publications", line 53, after "09/515,575", insert --,--, therefor On title page 5, in column 1, item 56, under "Other Publications", line 55, after "09/515,575", insert --,--, therefor On title page 5, in column 1, item 56, under "Other Publications", line 57, after "09/515,575", insert --,--, therefor On title page 5, in column 1, item 56, under "Other Publications", line 59, after "09/515,575", insert --,--, therefor On title page 5, in column 1, item 56, under "Other Publications", line 61, after "09/515,575", insert --,--, therefor On title page 5, in column 1, item 56, under "Other Publications", line 63, after "09/515,575", insert --,--,  therefor On title page 5, in column 1, item 56, under "Other Publications", line 65, after "09/515,575", insert --,--, therefor On title page 5, in column 1, item 56, under "Other Publications", line 67, after "09/515,575", insert --,--, therefor On title page 5, in column 1, item 56, under "Other Publications", line 69, after "09/515,575", insert --,--, therefor On title page 5, in column 1, item 56, under "Other Publications", line 71, after "09/515,575", insert --,--, therefor On title page 5, in column 2, item 56, under "Other Publications", line 1, after "09/515,575", insert --,--, therefor On title page 5, in column 2, item 56, under "Other Publications", line 3, after "09/515,575", insert --,--, therefor On title page 5, in column 2, item 56, under "Other Publications", line 5, after "09/515,575", insert --,--, therefor On title page 5, in column 2, item 56, under "Other Publications", line 7, after "09/515,575", insert --,--, therefor On title page 5, in column 2, item 56, under "Other Publications", line 9, after "09/515,575", insert --,--, therefor On title page 5, in column 2, item 56, under "Other Publications", line 11, after "09/515,575", insert --,--, therefor On title page 5, in column 2, item 56, under "Other Publications", line 13, after "09/515,575", insert --,--, therefor On title page 5, in column 2, item 56, under "Other Publications", line 14, delete "PgS" and insert --pgs--, therefor On title page 5, in column 2, item 56, under "Other Publications", line 15, delete "09/740,502 final office action" and insert --09/740,502, Final Office Action--, therefor On title page 5, in column 2, item 56, under "Other Publications", line 16, delete "PGS" and insert --pgs--, therefor On title page 5, in column 2, item 56, under "Other Publications", line 17, delete "09/740,502 final office action" and insert --09/740,502, Final Office Action--, therefor On title page 5, in column 2, item 56, under "Other Publications", line 18, delete "PGS" and insert --pgs--, therefor On title page 5, in column 2, item 56, under "Other Publications", line 19, delete "09/740,502 final office action" and insert --09/740,502, Final Office Action--, therefor On title page 5, in column 2, item 56, under "Other Publications", line 20, before "",12 PGS", delete "Pgs", therefor On title page 5, in column 2, item 56, under "Other Publications", line 20, delete "PGS" and insert --pgs--, therefor CERTIFICATE OF CORRECTION (continued)
U.S. Pat. No. 8,290,809 B1

On title page 5, in column 2, item 56, under "Other Publications", line 21, delete "09/740,502 non-final office action" and insert --09/740,502, Non Final Office Action--, therefor On title page 5, in column 2, item 56, under "Other Publications", line 22, delete "PGS" and insert --pgs--, therefor On title page 5, in column 2, item 56, under "Other Publications", line 23, delete "09/740,502 non-final office action" and insert --09/740,502, Non Final Office Action--, therefor On title page 5, in column 2, item 56, under "Other Publications", line 24, delete "PGS" and insert --pgs--, therefor On title page 5, in column 2, item 56, under "Other Publications", line 25, delete "09/740,502 non-final office action" and insert --09/740,502, Non Final Office Action--, therefor On title page 5, in column 2, item 56, under "Other Publications", line 26, delete "PGS" and insert --pgs--, therefor On title page 5, in column 2, item 56, under "Other Publications", line 27, after "09/740,502", insert --,--, therefor On title page 5, in column 2, item 56, under "Other Publications", line 27-28, delete "non-final office action" and insert --Non Final Office Action--, therefor On title page 5, in column 2, item 56, under "Other Publications", line 28, delete "PGS" and insert --pgs--, therefor On title page 5, in column 2, item 56, under "Other Publications", line 29, after "09/740,502", insert --,--, therefor On title page 5, in column 2, item 56, under "Other Publications", line 29-30, delete "non-final office action" and insert --to Non Final Office Action--, therefor On title page 5, in column 2, item 56, under "Other Publications", line 30, delete "PGS" and insert --pgs--, therefor On title page 5, in column 2, item 56, under "Other Publications", line 31, after "09/740,502", insert --,--, therefor On title page 5, in column 2, item 56, under "Other Publications", line 31-32, delete "non-final office action" and insert --to Non Final Office Action--, therefor On title page 5, in column 2, item 56, under "Other Publications", line 32, delete "PGS" and insert --pgs--, therefor

CERTIFICATE OF CORRECTION (continued)
U.S. Pat. No. 8,290,809 B1

On title page 5, in column 2, item 56, under "Other Publications", line 33, after "09/740,502", insert --,--, therefor On title page 5, in column 2, item 56, under "Other Publications", line 33-34, delete "final office action" and insert --to Final Office Action--, therefor On title page 5, in column 2, item 56, under "Other Publications", line 34, delete "PGS" and insert --pgs--, therefor On title page 5, in column 2, item 56, under "Other Publications", line 35, after "09/740,502" insert --,--, therefor On title page 5, in column 2, item 56, under "Other Publications", line 35-36, delete "final office action" and insert --to Final Office Action--, therefor On title page 5, in column 2, item 56, under "Other Publications", line 36, delete "PGS" and insert --pgs--, therefor On title page 5, in column 2, item 56, under "Other Publications", line 37, after "09/740,502", insert --,--, therefor On title page 5, in column 2, item 56, under "Other Publications", line 37-38, delete "final office action" and insert --Final Office Action--, therefor On title page 5, in column 2, item 56, under "Other Publications", line 38, delete "PGS" and insert --pgs--, therefor On title page 5, in column 2, item 56, under "Other Publications", line 51, after "09/740,502", insert --,--, therefor On title page 5, in column 2, item 56, under "Other Publications", line 53, after "09/740,502", insert --,--, therefor On title page 6, in column 1, item 56, under "Other Publications", line 25, after "10/746,583", insert --,--, therefor On title page 6, in column 1, item 56, under "Other Publications", line 53, delete "W," and insert --W.,--, therefor On title page 6, in column 2, item 56, under "Other Publications", line 3, delete "J," and insert --J.,--, therefor On title page 6, in column 2, item 56, under "Other Publications", line 10, delete "A," and insert --A.,--, therefor On title page 6, in column 2, item 56, under "Other Publications", line 17, delete "B S," and insert --B. S.,--, therefor On title page 6, in column 2, item 56, under "Other Publications", line 37, delete "A," and insert --A.,--, therefor On title page 6, in column 2, item 56, under "Other Publications", line 60, delete "10/746,583 ," and insert --10/746,583,--, therefor On title page 7, in column 1, item 56, under "Other Publications", line 8, after "Paul", insert --,--, therefor On title page 7, in column 1, item 56, under "Other Publications", line 65, delete "Mailed" and insert --mailed--, therefor On title page 7, in column 2, item 56, under "Other Publications", line 28, after "Report", insert --mailed--, therefor On title page 7, in column 2, item 56, under "Other Publications", line 42, after "12/777,144", insert --,--, therefor On title page 7, in column 2, item 56, under "Other Publications", line 60, after "3", insert --pgs--, therefor On title page 7, in column 2, item 56, under "Other Publications", line 70, delete "Aug. 7, 2011" and insert --Apr. 7, 2011--, therefor In the Specification In column 3, line 58, delete "garners" and insert --gamers--, therefor In column 6, line 33, delete "305" and insert --355--, therefor In column 6, line 44, delete "etc" and insert --etc.--, therefor In column 7, line 21, delete "future;" and insert --future,--, therefor